US012722153B2

(12) United States Patent
Wei et al.

(10) Patent No.: US 12,722,153 B2
(45) Date of Patent: Sep. 1, 2026

(54) MICROFLUIDIC CHIP, TEMPERATURE MEASUREMENT METHOD USING THE SAME, AND ANALYSIS DEVICE USING THE SAME

(71) Applicants: Beijing BOE Optoelectronics Technology Co., Ltd., Beijing (CN); BOE TECHNOLOGY GROUP CO., LTD., Beijing (CN)

(72) Inventors: Qiuxu Wei, Beijing (CN); Bolin Fan, Beijing (CN); Le Gu, Beijing (CN); Yue Li, Beijing (CN); Li Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 679 days.

(21) Appl. No.: 18/024,878

(22) PCT Filed: Mar. 15, 2022

(86) PCT No.: PCT/CN2022/080933

§ 371 (c)(1),
(2) Date: Mar. 6, 2023

(87) PCT Pub. No.: WO2023/173287

PCT Pub. Date: Sep. 21, 2023

(65) Prior Publication Data

US 2024/0293810 A1 Sep. 5, 2024

(51) Int. Cl.
*B01L 3/00* (2006.01)
*G01K 7/16* (2006.01)

(52) U.S. Cl.
CPC ... *B01L 3/502715* (2013.01); *B01L 3/502746* (2013.01); *G01K 7/16* (2013.01)

(58) Field of Classification Search
CPC ............ B01L 3/502715; B01L 3/5027; B01L 3/502746; B01L 3/502792;
(Continued)

(56) References Cited

U.S. PATENT DOCUMENTS 6,939,451 B2 * 9/2005 Zhao ................ G01N 27/44704 422/68.1
2007/0113648 A1 * 5/2007 Arisaka ................ G01N 27/223 73/335.04

(Continued)

FOREIGN PATENT DOCUMENTS

CN 104122469 A 10/2014
CN 104011519 B 3/2016

(Continued)

*Primary Examiner* — Dean Kwak
(74) *Attorney, Agent, or Firm* — WHDA, LLP

(57) ABSTRACT

The application provides a microfluidic chip, a temperature measurement method using the same, and an analysis device, which relates to the field of microfluidic technology. The microfluidic chip includes: a substrate and at least one microfluidic module located on the substrate, wherein the microfluidic module includes a droplet control unit and at least one temperature detection unit, and wherein the temperature detection unit includes a temperature sensor, a first lead group and a second lead group, the temperature sensor is fixed on the substrate, the first lead group and the second lead group are electrically connected with the temperature sensor respectively, the first lead group is configured to transmit a constant current to the temperature sensor, and the second lead group is configured to electrically connect the temperature sensor and an external voltmeter.

19 Claims, 22 Drawing Sheets

(58) Field of Classification Search
CPC ....... B01L 2200/147; B01L 2300/0645; B01L 2300/1827; G01K 7/16
See application file for complete search history.

(56) References Cited

U.S. PATENT DOCUMENTS

| | | | | |
|---|---|---|---|---|
| 2014/0374596 | A1 | 12/2014 | Tari et al. | |
| 2022/0219172 | A1 * | 7/2022 | Soto-Moreno .......... | B01L 9/527 |

FOREIGN PATENT DOCUMENTS

| | | | |
|---|---|---|---|
| CN | 106768493 | A | 5/2017 |
| CN | 111609947 | A | 9/2020 |
| CN | 113289562 | A | 8/2021 |
| WO | 2012/069463 | A2 | 5/2012 |

* cited by examiner

MICROFLUIDIC CHIP, TEMPERATURE MEASUREMENT METHOD USING THE SAME, AND ANALYSIS DEVICE USING THE SAME

CROSS-REFERENCE TO RELATED APPLICATION

The present disclosure is a National Stage of International Application No. PCT/CN2022/080933, filed on Mar. 15, 2022, with the title of "MICROFLUIDIC CHIP, TEMPERATURE MEASUREMENT METHOD USING THE SAME, AND ANALYSIS DEVICE USING THE SAME", which is incorporated herein in its entirety by reference.

FIELD

The application relates to the field of microfluidic technology, in particular to a microfluidic chip, a temperature measurement method using the microfluidic chip, and an analysis device using the microfluidic chip.

BACKGROUND

Microfluidics is to integrate basic operation units, such as sample preparation, reaction, separation and detection, etc., in an analysis process of biological, chemical or medical, into a chip of micro-scale, and automatically complete the whole analysis process. Due to its great potential in the fields of biology, chemistry and medicine, etc., it has developed into a new interdisciplinary subject involving chemistry, fluid physics, microelectronics, new materials, biology and biomedical engineering, and has received wide attention from industry insiders.

SUMMARY

Embodiments of the application adopts the following technical solutions.

In a first aspect, an embodiment of the present application provides a microfluidic chip, including: a substrate and at least one microfluidic module located on the substrate, wherein the microfluidic module includes a droplet control unit and at least one temperature detection unit, and wherein the temperature detection unit includes a temperature sensor, a first lead group and a second lead group, the temperature sensor is fixed on the substrate, the first lead group and the second lead group are electrically connected with the temperature sensor respectively, the first lead group is configured to transmit a constant current to the temperature sensor, and the second lead group is configured to electrically connect the temperature sensor and an external voltmeter.

In some embodiments of the disclosure, the first lead group includes a first lead and a second lead, and the second lead group includes a third lead and a fourth lead, and the temperature detection unit further includes first conductive pads and second conductive pads, and the first lead group and the temperature sensor are electrically connected with an external current source through two of the first conductive pads, and the second lead group and the temperature sensor are electrically connected with the external voltmeter through two of the second conductive pads.

In some embodiments of the disclosure, the temperature sensor includes a first temperature-sensitive resistor and a second temperature-sensitive resistor electrically connected, and the first temperature-sensitive resistor is a wire temperature-sensitive resistor, and the second temperature-sensitive resistor is a block temperature-sensitive resistor.

In some embodiments of the disclosure, in a condition that a temperature is determined, the first temperature-sensitive resistor is a constant resistance and the second temperature-sensitive resistor is an adjustable resistance, and a range of a resistance ratio of the first temperature-sensitive resistor to the second temperature-sensitive resistor, is less than or equal to 20:1.

In some embodiments of the disclosure, the block temperature-sensitive resistor has at least one hollow area, and a shape of an orthographic projection of the hollow area on the substrate includes any of an arc, a polygon, or a combination of the arc and the polygon.

In some embodiments of the disclosure, the block temperature-sensitive resistor has one hollow area, the hollow area includes a first hollow sub-area set along a first direction and a second hollow sub-area set along a second direction, shapes of orthographic projections of both the first hollow sub-area and the second hollow sub-area on the substrate are rectangle, and the first direction is a direction in which a liquid droplet flows, and the second direction is perpendicular to the first direction, and a ratio of a maximum size of the first hollow sub-area along the first direction to a maximum size of the second hollow sub-area along the second direction ranges from 1:9 to 3:7.

In some embodiments of the disclosure, the block temperature-sensitive resistor has a plurality of hollow areas set along a first direction, shapes of orthographic projections of the respective hollow areas on the substrate are all rectangles, and the respective hollow areas are not connected to each other, wherein the first direction is a direction in which a liquid droplet flows.

In some embodiments of the disclosure, a shape of an orthographic projection of an area of the block temperature-sensitive resistor on the substrate, other than the hollow areas, is serpentine.

In some embodiments of the disclosure, the temperature sensor includes a temperature-sensitive layer and a light-shielding layer located on the substrate, the light-shielding layer is located on a side of the temperature-sensitive layer away from the substrate, and an orthographic projection of the temperature-sensitive layer on the substrate is located within an orthographic projection of the light-shielding layer on the substrate, and the temperature-sensitive layer is in direct contact with the first lead group and the second lead group respectively.

In some embodiments of the disclosure, the temperature-sensitive layer, the first lead group and the second lead group are located in a same layer, the orthographic projection of the temperature-sensitive layer on the substrate and an orthographic projection of the first lead group on the substrate do not overlap to each other, and the orthographic projection of the temperature-sensitive layer on the substrate and an orthographic projection of the second lead group on the substrate do not overlap to each other.

In some embodiments of the disclosure, a part of the temperature-sensitive layer is located in a same layer with leads in the first lead group and the second lead group, and another part of the temperature-sensitive layer extends to a part of surface of at least one lead in the first lead group and the second lead group, away from the substrate.

In some embodiments of the disclosure, the temperature sensor further includes an insulating layer, the insulating layer is located between the temperature-sensitive layer and the light-shielding layer, an orthographic projection of the insulating layer on the substrate covers the orthographic projection of the temperature-sensitive layer on the substrate, and the orthographic projection of the insulating layer on the substrate covers the orthographic projection of the light-shielding layer on the substrate.

In some embodiments of the disclosure, the temperature sensor further includes a first electrode and a second electrode that are not connected to each other, and the first electrode, the second electrode, respective leads in the first lead group, and respective leads in the second lead group are in a same layer, and the first electrode is electrically connected with the first lead and the third lead respectively, and the second electrode is electrically connected with the second lead and the fourth lead respectively, and both an orthographic projection of the first electrode on the substrate and an orthographic projection of the second electrode on the substrate are located within the orthographic projection of the temperature-sensitive layer on the substrate, wherein both the first electrode and the second electrode are a gear-shaping electrode.

In some embodiments of the disclosure, the gear-shaping electrode includes at least three tooth electrodes extending in the first direction, and a connecting electrode extending in a direction perpendicular to the first direction, the connecting electrode electrically connects one ends of the respective tooth electrode, and the tooth electrodes of the first electrode and the tooth electrodes of the second electrode are spaced from each other, and an interval from the tooth electrodes of the first electrode to the tooth electrodes of the second electrode in the direction perpendicular to the first direction is less than or equal to 50 μm, wherein the first direction is a direction in which a liquid droplet flows.

In some embodiments of the disclosure, the temperature-sensitive layer further includes a hollow area, the hollow area extends along the first direction, a maximum size of the hollow area along the first direction is less than or equal to a half of a maximum size of the temperature-sensitive layer along the first direction, and the first direction is a direction in which a liquid droplet flows.

In some embodiments of the disclosure, the temperature sensor includes a thermistor, a first conductive layer and a second conductive layer, the thermistor is electrically connected with the first lead and the third lead through the first conductive layer, and the thermistor is electrically connected with the second lead and the fourth lead through the second conductive layer.

In some embodiments of the disclosure, an orthographic projection of the first conductive layer on the substrate and an orthographic projection of the second conductive layer on the substrate overlap with an orthographic projection of the thermistor on the substrate, respectively.

In some embodiments of the disclosure, the droplet control unit includes a plurality of driving electrode groups, the respective driving electrode groups are arranged along a first direction, and the first direction is a direction in which a liquid droplet flows, the driving electrode group includes a plurality of driving electrodes, a temperature measurement area is arranged among the driving electrodes in at least one of the driving electrode groups, and in the driving electrode group which is provided with the temperature measurement area, outer contours of orthographic projections of the respective driving electrodes on the substrate and an outer contour of the temperature measurement area are overlapped, and the temperature sensor is located in the temperature measurement area, and an outer contour of an orthographic projection of the temperature sensor on the substrate is located within the outer contour of the temperature measurement area.

In some embodiments of the disclosure, a shape of the orthographic projection the driving electrode on the substrate includes a rectangle and a chamfered rectangle, in the driving electrode group provided with the temperature measurement area, one corners of the respective driving electrodes have a concave part, and the temperature measurement area includes an area where the respective concave parts are located, and a length of the concave part along a second direction, is less than or equal to, one third of a length of a side of the driving electrode, on which the concave part is set, along the second direction, wherein the second direction is perpendicular to the first direction.

In some embodiments of the disclosure, the droplet control unit includes an external pump valve, and an orthographic projection of the external pump valve on the substrate is located within an outer contour of the substrate.

In a second aspect, an embodiment of the present application provides an analysis device using the above microfluidic chip, including the above microfluidic chip.

In a third aspect, an embodiment of the present application provides a temperature measurement method using the above microfluidic chip, including:

providing the constant current to the temperature sensor of the microfluidic chip through the first lead group, and determining a current value of the constant current flowing through the temperature sensor;

measuring a voltage across two ends of the temperature sensor through the external voltmeter electrically connected to the second lead group, and obtaining a voltage value;

determining a resistance value of the temperature sensor according to the current value and the voltage value; and determine a temperature value measured by the temperature sensor according to the resistance value of the temperature sensor.

The above description is only an overview of the technical solutions of the application. In order to better understand the technical means of the application, so as to implement the technical means according to the contents of the specification, and in order to make the above and other purposes, features and advantages of the application more distinct and understandable, specific implementations of the application are listed below.

BRIEF DESCRIPTION OF THE DRAWINGS

In order to more clearly illustrate technical solutions in embodiments of the disclosure or in related technology, the followings will briefly introduce drawings needed to be used in illustrating the embodiments or the related technology. Apparently, the drawings in the following description are only some embodiments of the disclosure. For those ordinary skilled in the field, they may further obtain other drawings according to the provided drawings without paying creative labor.

DETAILED DESCRIPTION OF THE EMBODIMENTS

Figure 1:
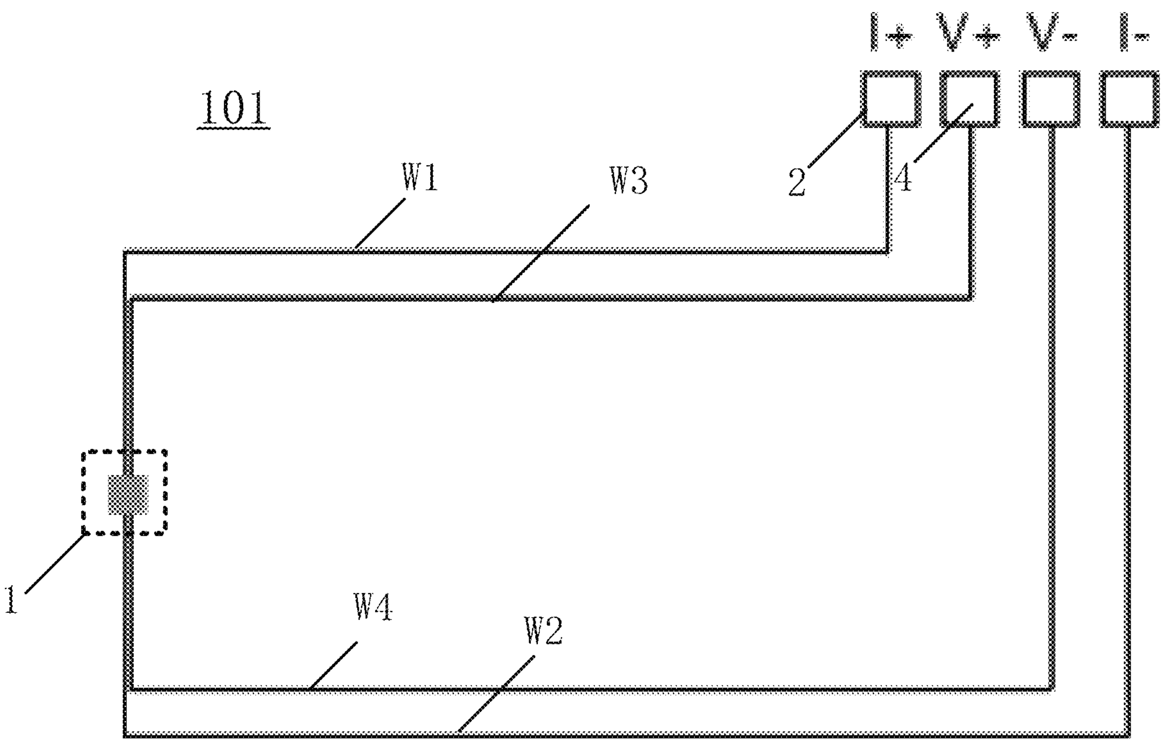
FIG. 1 is a schematic view of a structure of a temperature measurement circuit of a microfluidic chip provided by an embodiment of the application.

The followings will describe the technical solutions in the embodiments of the application clearly and completely in combination with the drawings in the embodiments of the application. Apparently, the described embodiments are a part of the embodiments of the application, not all of the embodiments of the application. Based on the embodiments in the application, all other embodiments obtained by the ordinary skilled in the art without doing creative work belong to the scope of protection in the application.

In the drawings, thicknesses of areas and layers may be exaggerated for clarity. The same reference numerals in the drawings represent the same or similar structures, so the detailed description thereof will be omitted. In addition, the drawings are only schematic illustrations of the application, and are not necessarily drawn to scale.

Unless otherwise required by the context, in the entire specification and claims, the term "including" is interpreted as open and inclusive, which means "including, but not limited to". In the description of the specification, the terms "one embodiment", "some embodiments", "an exemplary embodiment", "an example", "a specific example" or "some examples" are intended to indicate that specific features, structures, materials or characteristics related to the embodiment or example are included in at least one embodiment or example of the application. The illustrative representation of the above terms does not necessarily refer to the same embodiment or example. In addition, the above specific features, structures, materials or characteristics may be included in any one or more embodiments or examples in any appropriate manner.

In the embodiments of the present application, the words such as "first", "second", etc. are used to describe the same or similar items with basically the same function and action, only for the purpose of clearly describing the technical solution of the embodiments of the present application, and shall not be understood as indicating or implying relative importance or implying quantity of an indicated technical feature.

Micro Fluidics technology is a new interdisciplinary subject involving chemistry, fluid physics, microelectronics, new materials, biology and biomedical engineering, which may realize precise control and manipulation of tiny droplets. A chip adopting microfluidic technology is usually called a microfluidic chip, which is an important part of a laboratory system on chip. Various samples such as cells, etc., may be cultured, moved, detected and analyzed in the microfluidic chip, which is not only widely used in chemical and medical fields, but also receive more and more attention in other fields.

The microfluidic chip is a digital microfluidic chip based on a dielectric wetting (EWOD) technology, a principle of which is to set a liquid droplet on a surface with a hydrophobic layer, then, by help of an electric wetting effect, and by applying a voltage to the liquid droplet, wettability between the liquid droplet and the hydrophobic layer is changed, resulting in pressure difference and asymmetric deformation inside the liquid droplet, thus realizing directional movement of the liquid droplet.

For most biochemical reactions, a reaction temperature is critical to a reaction result. It is necessary to detect and control a temperature of a reaction process in the microfluidic chip. At present, temperature measurement methods adopted in microfluidic systems may be divided into two types, i.e., a contact type and a non-contact type, according to whether a sensor is in contact with the microfluidic chip. Among them, a measurement principle of the non-contact type of temperature measurement method includes fluorescence method, optical fiber interference method, microwave method, etc., which have characteristics of no contact and flexible testing, but such a method may not directly contact with a sample to be measured, and is interfered by an external environment, resulting in poor detection accuracy. The contact type of temperature measurement method may be divided into two types, i.e., an external type and an integrated type, according to whether the sensor is integrated in the microfluidic chip. Among them, the external type of temperature measurement method is to attach a thermocouple or a thermistor to outside of the microfluidic chip, a temperature measurement effect of such a method is easily affected by an external temperature, and there is a certain degree of temperature gradient error on a substrate layer of the microfluidic chip. The integrated type of temperature measurement method is to sputter or evaporate metal or semiconductor materials as the thermistor in the microfluidic chip, the sensor prepared by such a method is in direct contact with the liquid droplet, however, detection accuracy of which is not high.

Figure 2:
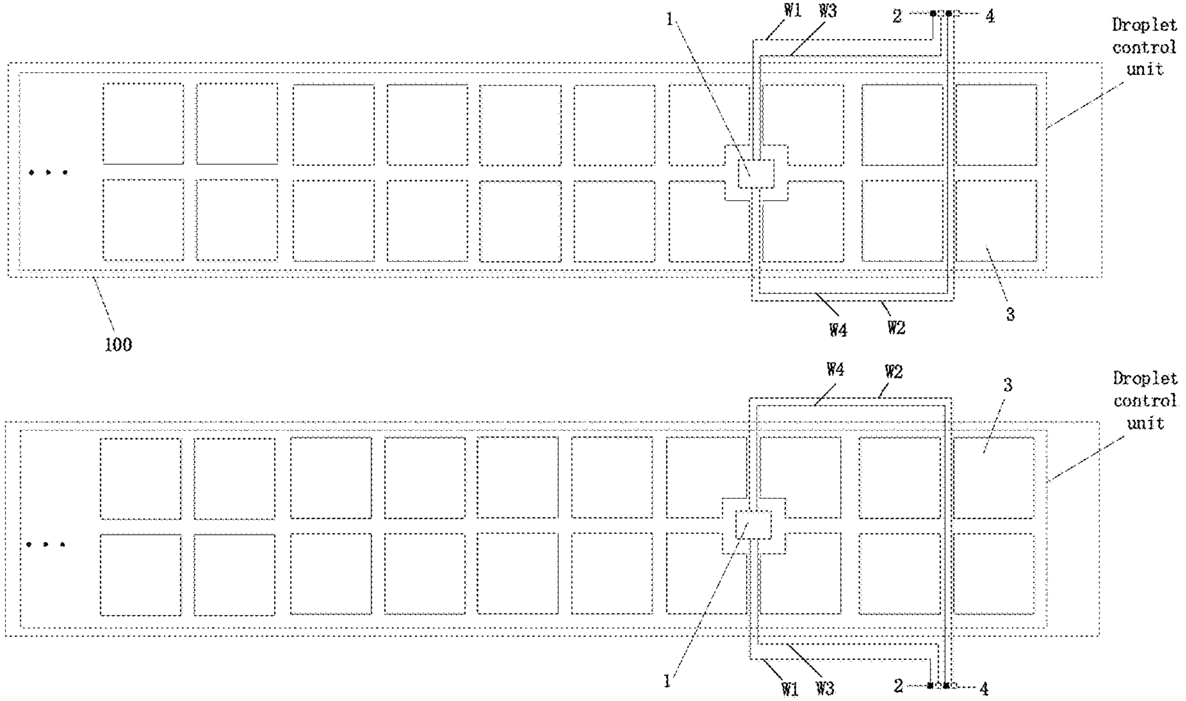
FIG. 2 and FIG. 5-FIG. 21 are schematic views of structures of eighteen microfluidic chips provided by embodiments of the application.
Figure 3:
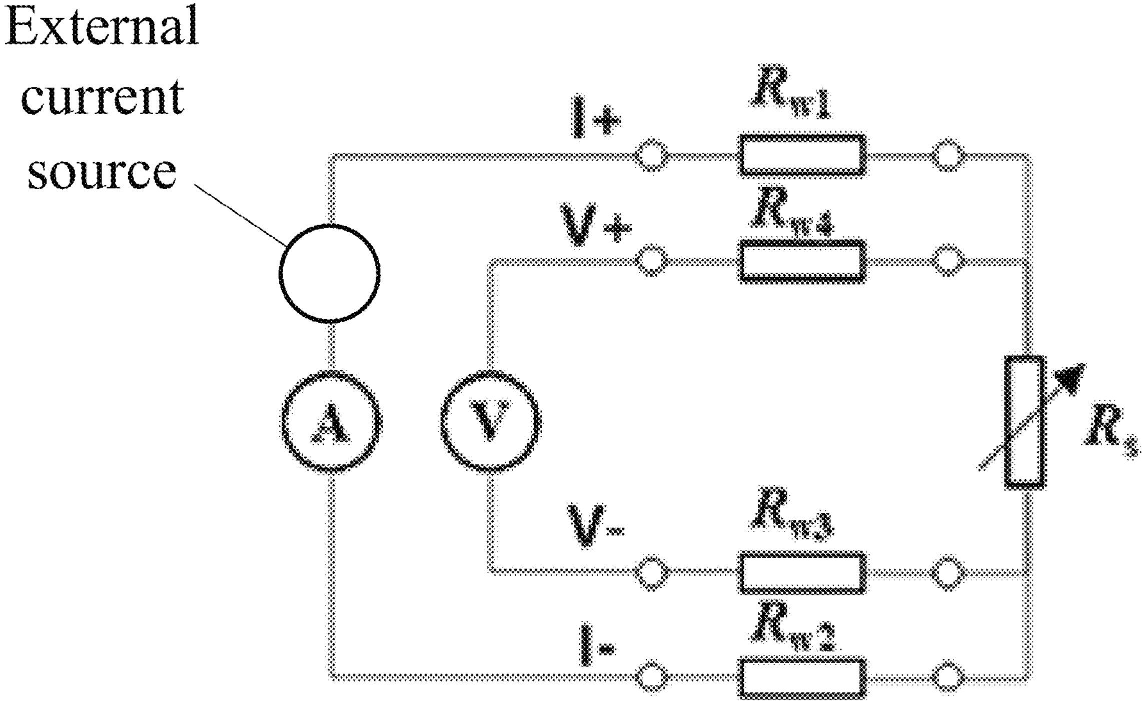
FIG. 3 is a schematic view of a temperature measurement principle of a microfluidic chip provided by an embodiment of the application.

Based on the above, an embodiment of the present application provides a microfluidic chip, as shown in a combination of FIG. 1, FIG. 2 and FIG. 3, including: a substrate and at least one microfluidic module 100 located on the substrate. The microfluidic module 100 includes a droplet control unit and at least one temperature detection unit 101 as shown in FIG. 1.

Among them, the temperature detection unit 101 includes a temperature sensor 1, a first lead group (including W1 and W2, for example) and a second lead group (including W3 and W4, for example). The temperature sensor 1 is fixed on the substrate, and the first lead group and the second lead group are electrically connected with the temperature sensor 1 respectively. The first lead group is configured to transmit a constant current to the temperature sensor 1, and the second lead group is configured to electrically connect the temperature sensor 1 and an external voltmeter.

A specific structure of the above substrate is not limited here, and but may be determined according to an actual application requirement of the microfluidic chip.

A specific number of the microfluidic modules 100 on the substrate is not limited here. For example, a plurality of microfluidic modules 100 are arranged on the substrate, and the plurality of microfluidic modules 100 are arranged in an array.

In an exemplary embodiment, the droplet control unit is configured to drive the liquid droplet to move in the microfluidic module 100, and assist the microfluidic chip to complete analysis of a sample of the liquid droplet.

For example, the droplet control unit may include a plurality of driving electrodes 3 as shown in FIG. 2. Alternatively, the droplet control unit may include at least one external pump valve.

A specific type and a structure of the above temperature sensor are not limited here, but may be determined according to an actual situation.

For example, the above temperature sensor may include a NTC (negative temperature coefficient) type of temperature sensor. Alternatively, the above temperature sensor may include a RTD (resistance temperature detector) type of temperature sensor.

In the exemplary embodiment, a meaning that the temperature sensor 1 is fixed on the substrate is: the temperature sensor 1 is directly integrated on the substrate, alternatively, the temperature sensor 1 is mounted on the substrate through a fixing part, wherein the fixing part may include a fastener and/or an adhesive layer.

A specific structure and materials of the above fastener and the adhesive layer are not limited here, and may be determined according to an actual situation.

In practical applications, for the temperature sensor 1 directly integrated on the substrate, it may directly contact with the liquid droplet to be tested in the microfluidic chip. For the temperature sensor installed on the substrate through the fixed part, at least a part of area of the temperature sensor may directly contact with the droplet to be tested in the microfluidic chip.

In the embodiment of the application, the temperature sensor is fixed on the substrate, such that the liquid drop may directly contact at least a part of the temperature sensor when performing a temperature measurement, which avoids interference of an external environment on the temperature measurement, and improves accuracy of the temperature measurement.

In an exemplary embodiment, the first lead group includes at least two leads, and a number of the leads in the first lead group is an even number.

For example, the first lead group may include a first lead W1 and a second lead W2, to electrically connect two ends of the temperature sensor 1 and two ends of a constant current source.

For example, the first lead group may include the first lead W1 and the second lead W2, as well as a fifth lead and a sixth lead. The first lead W1 and the second lead W2 may electrically connect the two ends of the temperature sensor 1 and the two ends of the constant current source, and the fifth lead and the sixth lead may electrically connect the two ends of the temperature sensor 1 and the two ends of the constant current source as well. In this way, when any of the first lead W1 and the second lead W2 is damaged, an open circuit between the temperature sensor 1 and the constant current source may be avoided, thus improving a service life of the microfluidic chip.

In an exemplary embodiment, the second lead group includes at least two leads, and a number of the leads in the second lead group is an even number.

For example, the second lead group may include the third lead W3 and the fourth lead W4, to electrically connect the temperature sensor 1 and the external voltmeter.

For example, the second lead group may include the third lead W3 and the fourth lead W4, as well as a seventh lead and an eighth lead. The third lead W3 and the fourth lead W4 may electrically connect the temperature sensor 1 and the external voltmeter, and the seventh lead and the eighth lead may electrically connect the temperature sensor 1 and the external voltmeter as well. In this way, when any of the third lead W3 and the fourth lead W4 is damaged, an open circuit between the temperature sensor 1 and the external voltmeter may be avoided, thus improving the service life of the microfluidic chip.

In some embodiments of the present application, referring to that shown in FIG. 1 or FIG. 2, the first lead group includes the first lead W1 and the second lead W2, the second lead group includes the third lead W3 and the fourth lead W4, and the temperature detection unit 101 further includes first conductive pads 2 and second conductive pads 4.

The first lead group and the temperature sensor 1 are electrically connected with the external current source through two first conductive pads 2. The second lead group and the temperature sensor 1 are electrically connected with the external voltmeter through two second conductive pads 4.

Whether materials of the leads in the first lead group, the leads in the second lead group, and the respective conductive pads (Pad) described above are the same, is not limited here.

For example, the materials of the leads in the first lead group, the leads in the second lead group, and the respective conductive pads (Pad) described above may be the same, and all include at least one or a combination of more of molybdenum (Mo), aluminum (Al), copper (Cu), and indium tin oxide (ITO).

Figure 4:
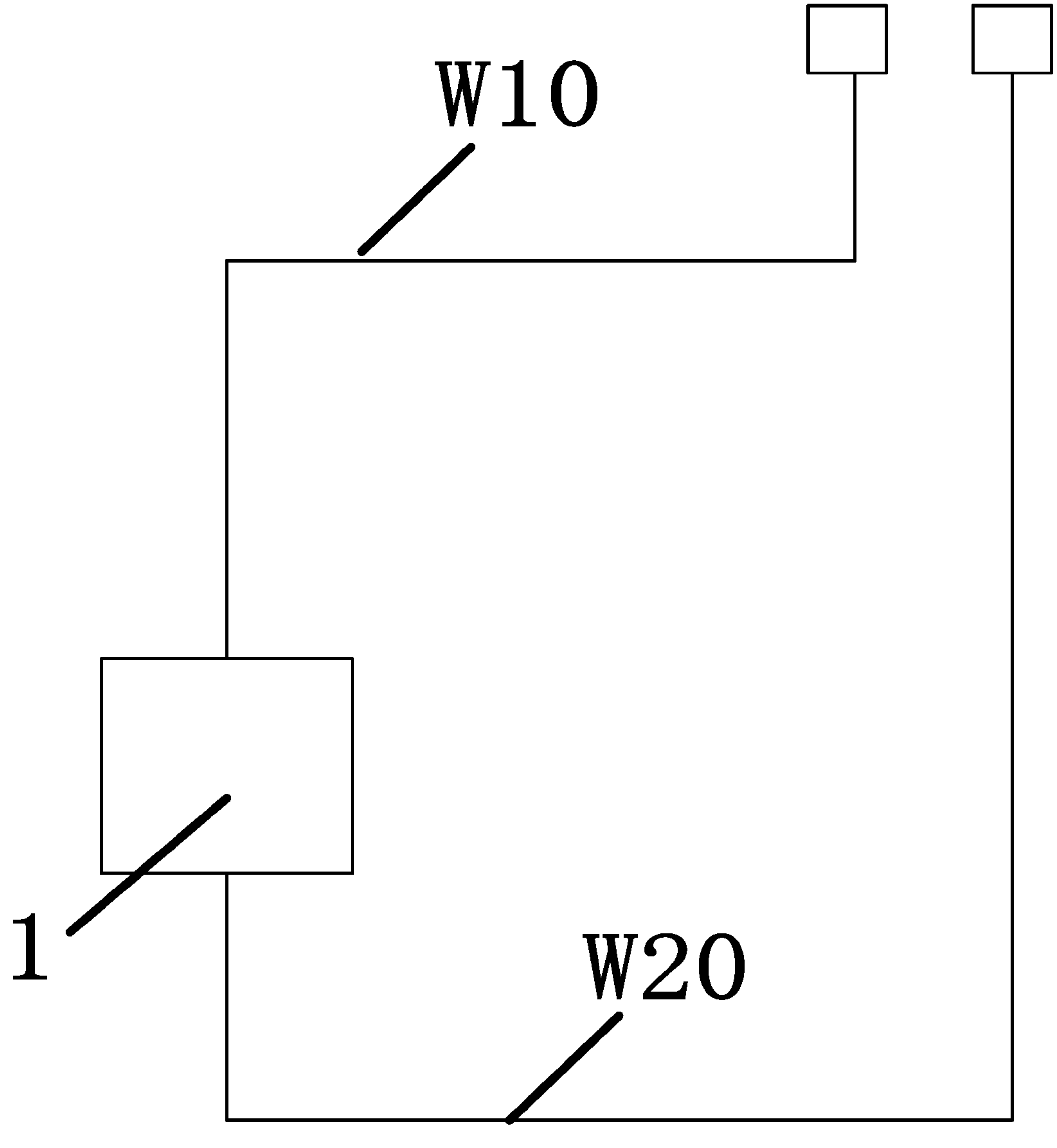
FIG. 4 is a schematic view of a structure of a temperature measurement circuit of a microfluidic chip in related technology.

In related technology, referring to that shown in FIG. 4, the two ends of the temperature sensor 1 and the constant current source are electrically connected by two leads (W10 and W20), and the two ends of the temperature sensor 1 and the external voltmeter are electrically connected by two leads (W10 and W20) as well. When measuring a voltage of the temperature sensor 1, due to an interference of self-resistances of the leads (W10 and W20), a voltage value actually measured by the external voltmeter is a voltage value of a series of the temperature sensor 1 and the two leads (W10 and W20), which seriously reduces accuracy in measuring the voltage across the two ends of the temperature sensor.

In the embodiment of the present application, by setting the first lead group, the external constant current source transmits a constant current to the temperature sensor 1 through the first lead group, so that the two ends of the temperature sensor 1 have a specific voltage difference. By setting the second lead group, the temperature sensor 1 is electrically connected with the external voltmeter through the second lead group. In this way, because the constant current does not flow through the second lead group, the interference of the leads on the voltage measurement of the temperature sensor 1 is avoided, such that the voltage value measured by the external voltmeter is infinitely close to an actual voltage value across the two ends of the temperature sensor 1. Then the resistance value of the temperature sensor 1 is determined according to the voltage value and a current value of the constant current, and a temperature to be measured is determined according to a relationship between the resistance value and the temperature, thus improving detection precision and the detection accuracy of the temperature sensor 1.

It should be noted that, in FIG. 3, Rs represents the resistance of the temperature sensor 1, Rw1 represents a resistance of the first lead W1, Rw2 represents a resistance of the second lead W2, Rw3 represents a resistance of the third lead W3, Rw4 represents a resistance of the fourth lead W4, Ⓐ represents an ammeter, and Ⓥ represents the voltmeter.

Figure 5:
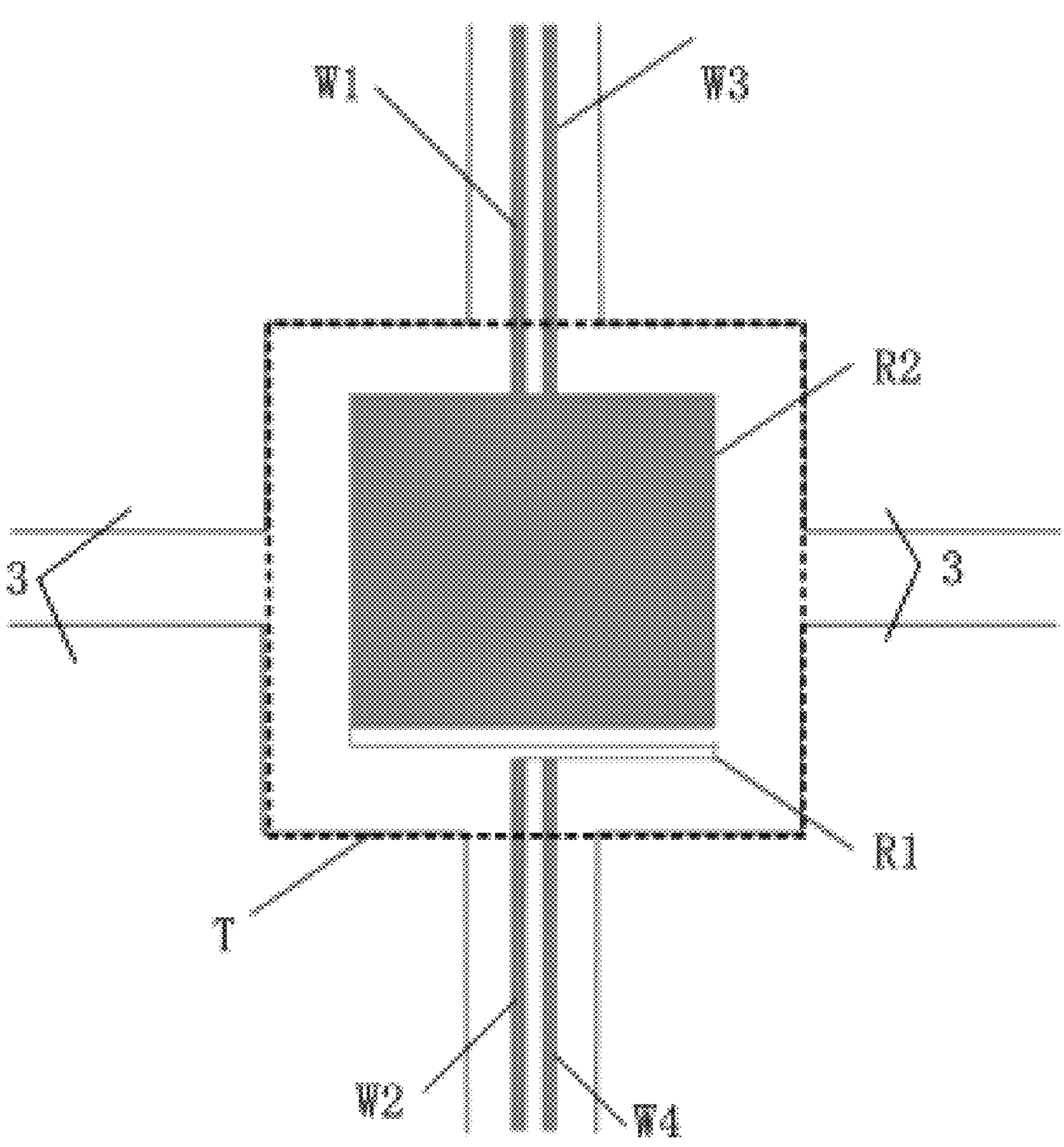

In some embodiments of the present application, referring to that shown in FIG. 5, the temperature sensor 1 includes a first temperature-sensitive resistor R1 and a second temperature-sensitive resistor R2 electrically connected to each other. The first temperature-sensitive resistor R1 is a wire temperature-sensitive resistor, and the second temperature-sensitive resistor R2 is a block temperature-sensitive resistor.

In some embodiments of the present application, in a condition that a temperature is determined, the first temperature-sensitive resistor R1 is a fixed resistance, and the second temperature-sensitive resistor R2 is an adjustable resistance. A range of a resistance ratio of the first temperature-sensitive resistor R1 to the second temperature-sensitive resistor R2, is less than or equal to 20:1.

In an exemplary embodiment, a resistance adjustment process by laser may be adopted, to change an aspect ratio of the block temperature-sensitive resistor by removing a part area of the block temperature-sensitive resistor, so as to realize a purpose of adjusting a resistance thereof.

It should be noted that, according to a definition of resistance, $R=\rho l/S=\rho l/(a*b)$, wherein, p is resistivity, a is a thickness of the block temperature-sensitive resistor, l is a length of the block temperature-sensitive resistor, and b is a width of the block temperature-sensitive resistor. After the block temperature-sensitive resistor is manufactured, its thickness a is a determined value. Later, a resistance value thereof may be adjusted by adjusting the ratio of the length l to the width b of the block temperature-sensitive resistor through the resistance adjustment process by laser.

In an exemplary embodiment, the first temperature-sensitive resistor R1 is a main resistance in the temperature sensor 1, and the second temperature-sensitive resistor R2 is an auxiliary resistance in the temperature sensor 1. A resistance value of first temperature-sensitive resistor R1 is relatively larger than that of the second temperature-sensitive resistor R2.

In practical applications, in order to ensure that the second temperature-sensitive resistor R2 has an appropriate space for adjusting the resistance thereof, the range of the resistance ratio of the first temperature-sensitive resistor R1 to the second temperature-sensitive resistor R2 may be set to be less than or equal to 20:1.

For example, the resistance ratio of the first temperature-sensitive resistor R1 to the second temperature-sensitive resistor R2 is equal to 20:1. Alternatively, the resistance ratio of the first temperature-sensitive resistor R1 to the second temperature-sensitive resistor R2 is equal to 20:2.

In an exemplary embodiment, a sum of the resistance values of the first temperature-sensitive resistor and the second temperature-sensitive resistor may be set to range from 10Ω to 1000Ω.

In the embodiment of the application, the resistance values of different temperature sensors in the same microfluidic chip may be the same, or different. If necessary, the resistance adjustment process by laser may ensure that the resistance values of different temperature sensors in the same microfluidic chip are the same, which improves consistency of sensor resistance values.

In an exemplary embodiment, a shape of an orthographic projection of the block temperature-sensitive resistor on the substrate may include any of an arc, a polygon, or a combination of the arc and the polygon. For example, the shape thereof may be a circular, an elliptical, a triangular or a quadrilateral.

Figure 6:
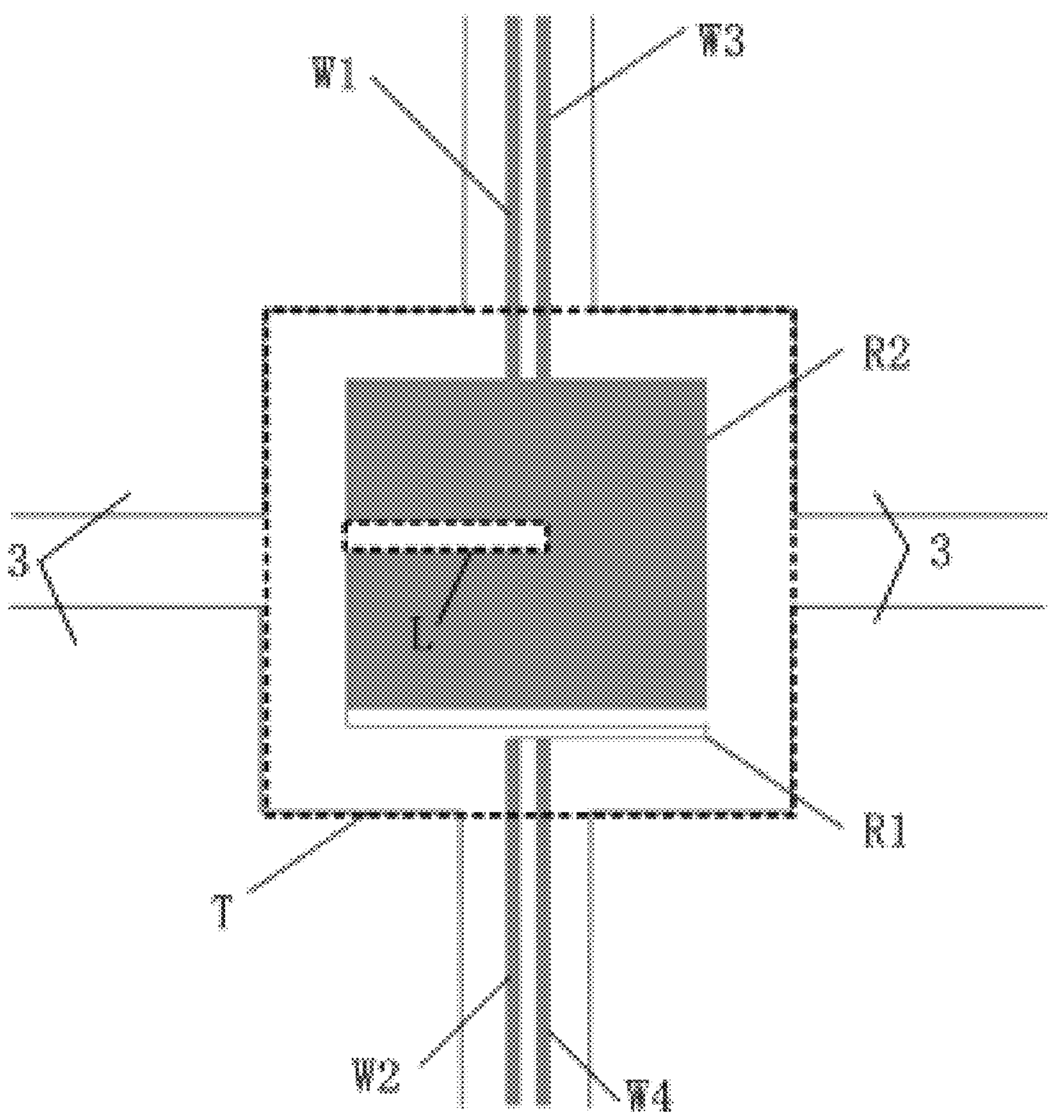

In some embodiments of the present application, referring to that shown in FIG. 6, the block temperature-sensitive resistor has at least one hollow area L, and a shape of an orthographic projection of the hollow area on the substrate includes any of an arc, a polygon, or a combination of the arc and the polygon.

For example, the polygon may include a triangle, a square, a rectangle or a diamond, and the arc may include a circle, a sector or an ellipse.

A specific size of the above hollow area L is not limited here, which may be set according to an actual situation.

Figure 7:
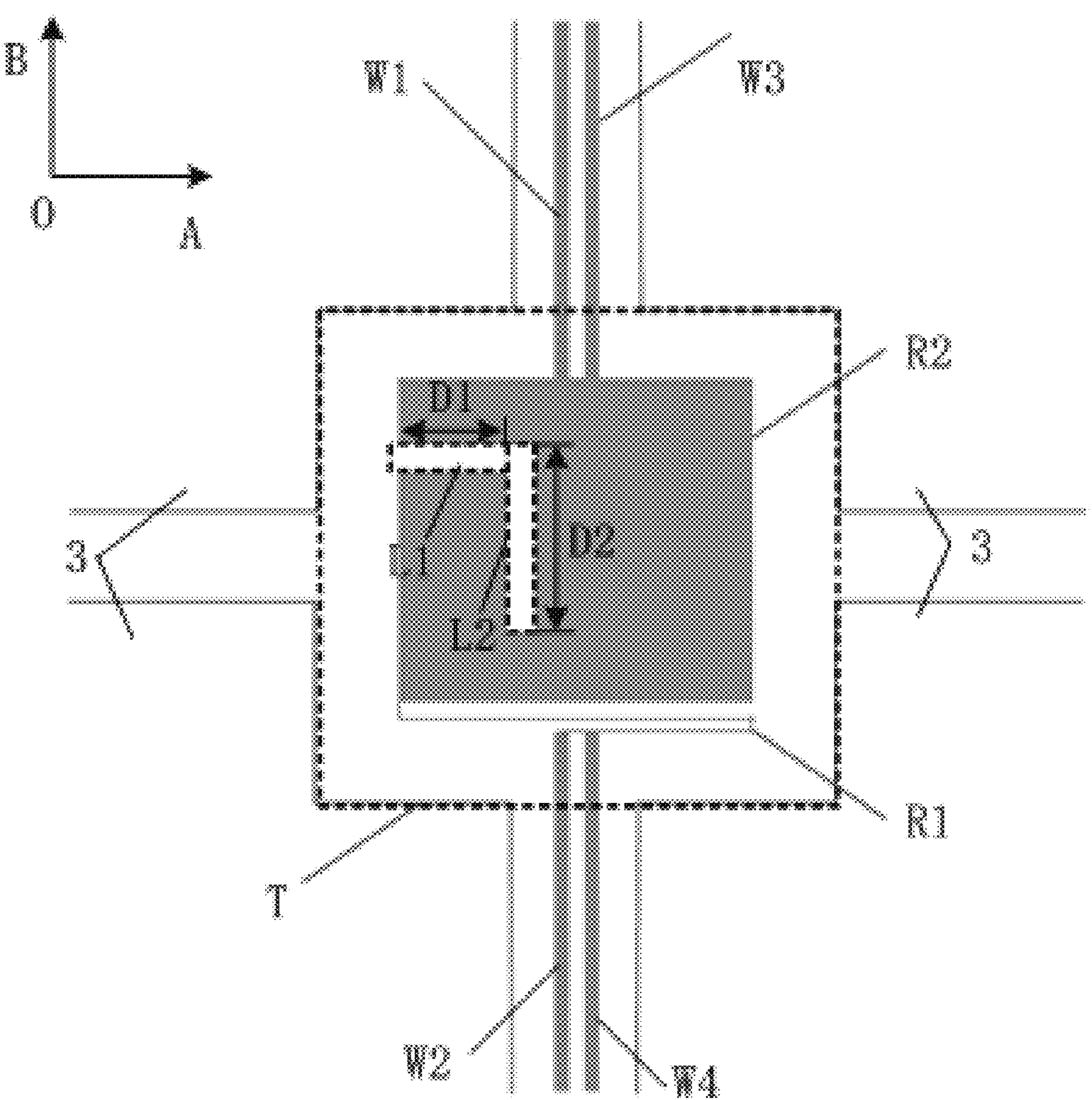

In some embodiments of the application, referring to that shown in FIG. 7, the block temperature-sensitive resistor has one hollow area L, the hollow area L includes a first hollow sub-area L1 set along a first direction OA and a second hollow sub-area L2 set along a second direction BO, shapes of orthographic projections of both the first hollow sub-area L1 and the second hollow sub-area L2 on the substrate are rectangle, and the first direction OA is a direction in which the liquid droplet flows, and the second direction BO is perpendicular to the first direction OA.

A ratio of a maximum size D1 of the first hollow sub-area L1 along the first direction OA to a maximum size D2 of the second hollow sub-area L2 along the second direction BO ranges from 1:9 to 3:7.

In FIG. 7, the shape of the orthographic projection of the hollow area L on the substrate is a L shape.

In an exemplary embodiment, the maximum size D1 of the first hollow sub-area L1 along the first direction OA may account for 10%-30% of a total cutting length of the hollow area L, and the maximum size D2 of the second hollow sub-area L2 along the second direction BO may account for 70%-90% of the total cutting length of the hollow area L.

In the embodiment of the present application, setting the hollow area L as shown in FIG. 7, has a better adjustment magnitude for a resistance value of the block temperature-sensitive resistor, and efficiency of resistance adjustment thereof is high, and a cost thereof is saved.

Figure 8:
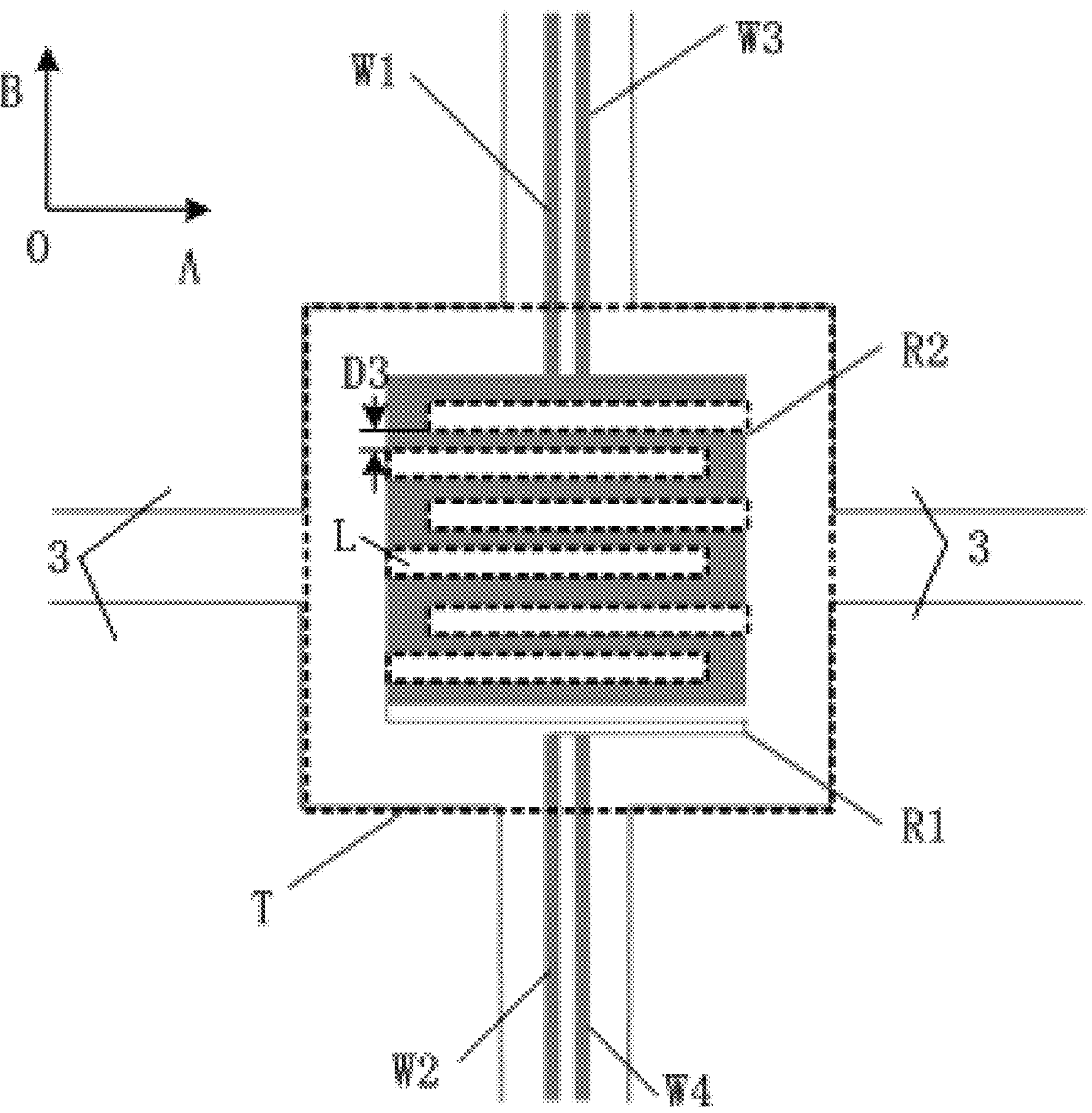

In some embodiments of the present application, referring to that shown in FIG. 8, the block temperature-sensitive resistor R2 has a plurality of hollow areas L set along the first direction OA. The shapes of the orthographic projections of the respective hollow areas L on the substrate are rectangles, and the respective hollow areas L are not connected to each other, wherein the first direction OA is the direction in which the liquid droplet flows.

In an exemplary embodiment, along the first direction OA, sizes of the respective hollow areas L are the same, and intervals D3 between respective two adjacent hollow areas L are the same.

In some embodiments of the present application, referring to that shown in FIG. 8, a shape of an orthographic projection of an area of the block temperature-sensitive resistor on the substrate, other than the hollow areas L, is serpentine.

In the embodiment of the present application, by setting a plurality of hollow areas L as shown in FIG. 8, the shape of the orthographic projection of the area of the block temperature-sensitive resistor on the substrate, other than the hollow areas L, is serpentine, such that a length-width ratio thereof may be adjusted to a great extent, thus the resistance value of the block temperature-sensitive resistor may be adjusted to a great extent.

In some embodiments of the present application, referring to that shown in any one of FIG. 9 to FIG. 13, the temperature sensor includes a temperature-sensitive layer 204 and a light-shielding layer 203 located on the substrate 201, the light-shielding layer 203 is located on a side of the temperature-sensitive layer 204 away from the substrate 201, and an orthographic projection of the temperature-sensitive layer 204 on the substrate 201 is located within an orthographic projection of the light-shielding layer 203 on the substrate 201. The temperature-sensitive layer 204 is in direct contact with the first lead group (including W1 and W2) and the second lead group (including W3 and W4) respectively.

Figure 9:
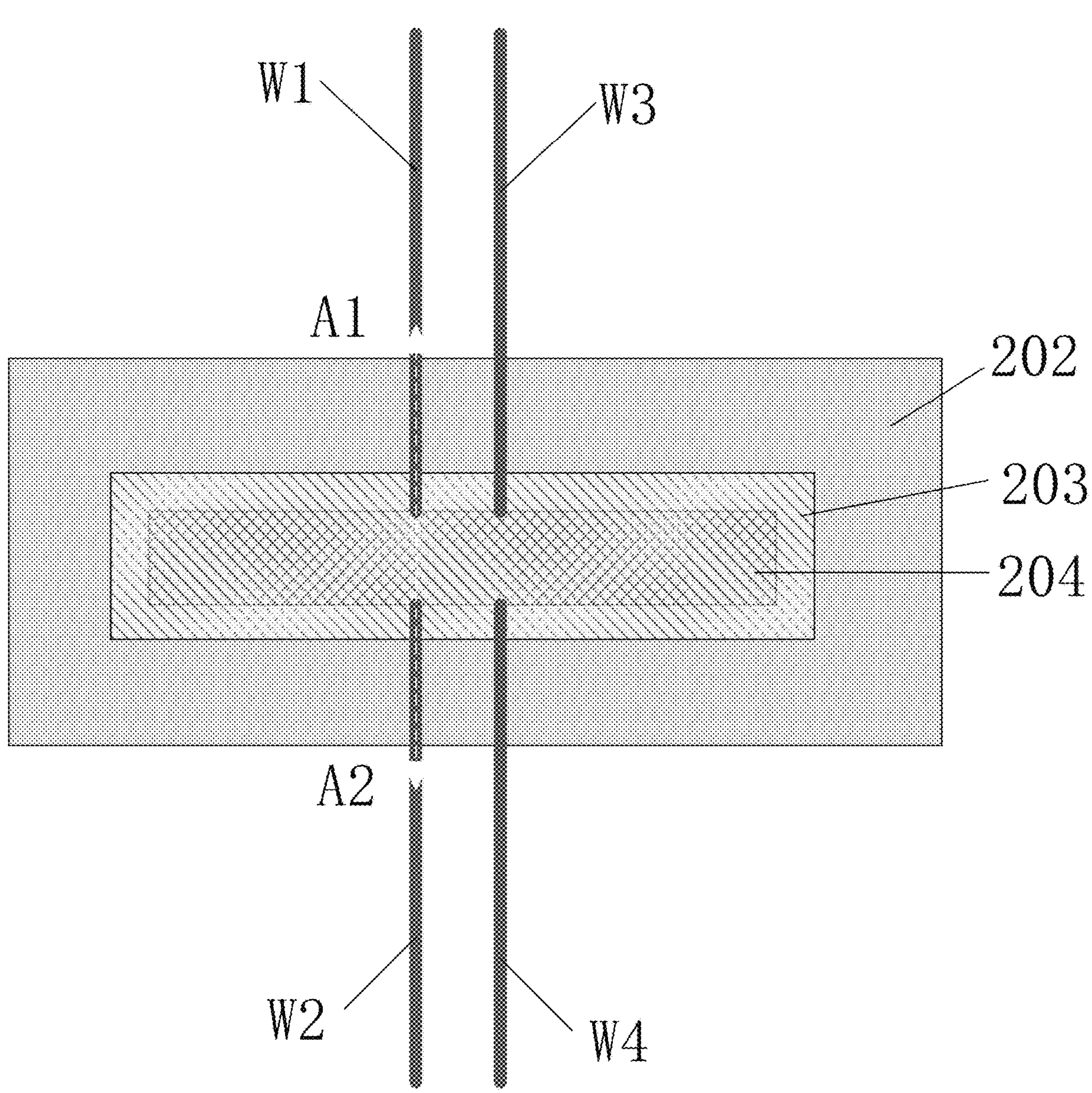
Figure 10:
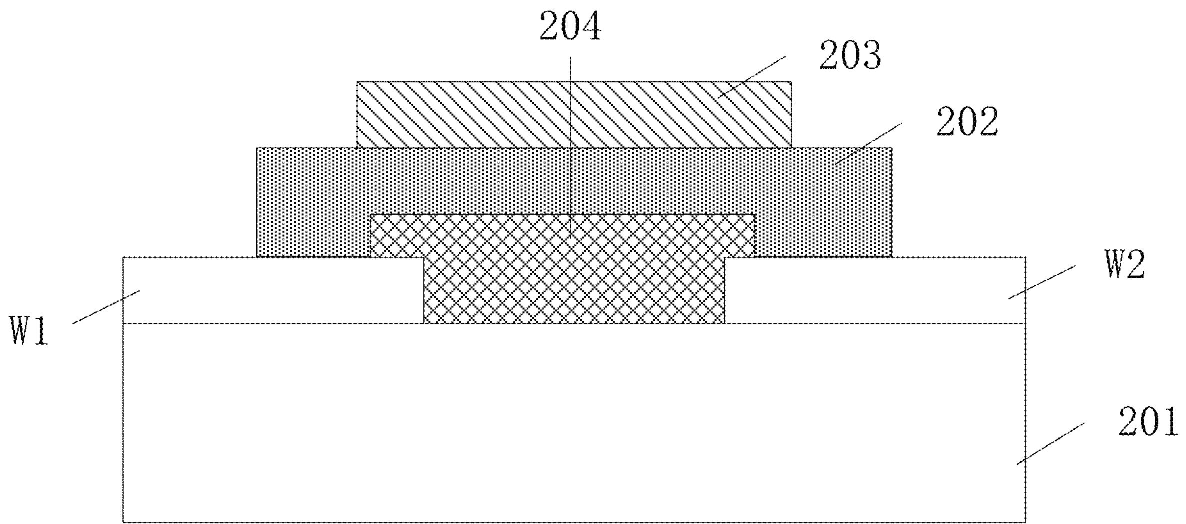

It should be noted that FIG. 10 is a sectional view along a A1A2 direction in FIG. 9.

Figure 11:
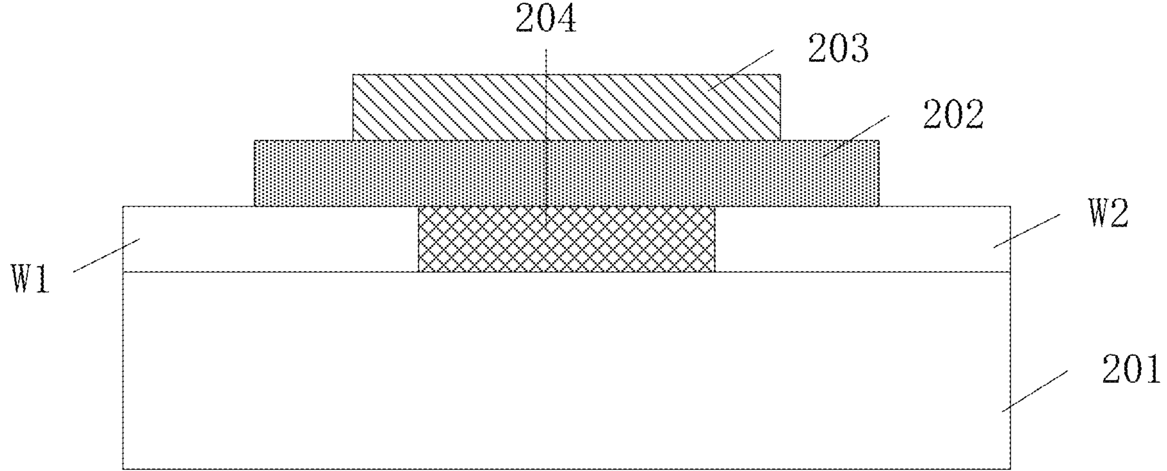
Figure 13:
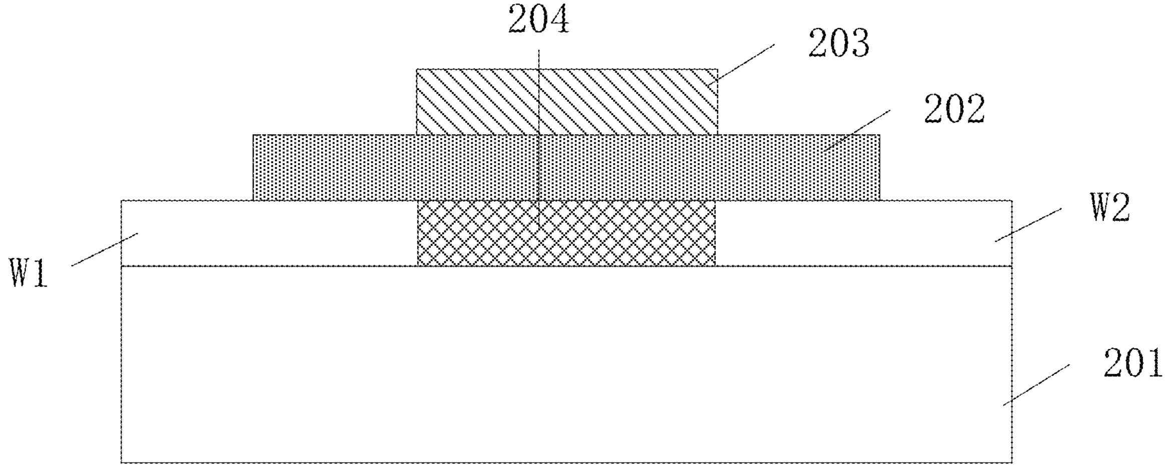

In an exemplary embodiment, a meaning that the orthographic projection of the temperature-sensitive layer 204 on the substrate 201 is within the orthographic projection of the light-shielding layer 203 on the substrate 201 is that, referring to that shown in FIG. 11, an outer contour of the orthographic projection of the temperature-sensitive layer 204 on the substrate 201 is within an outer contour of the orthographic projection of the light-shielding layer 203 on the substrate 201; alternatively, referring to that shown in FIG. 13, the outer contour of the orthographic projection of the temperature-sensitive layer 204 on the substrate 201 overlaps with the outer contour of the orthographic projection of the light-shielding layer 203 on the substrate 201.

Among them, a thickness of the temperature-sensitive layer 204 along a direction perpendicular to the substrate is in a level of micrometer, which may avoid an influence of the thickness of the temperature-sensitive layer on a control of the driving electrode to the liquid droplet.

A specific material of the above temperature-sensitive layer 204 is not limited here. For example, the material of the temperature-sensitive layer 204 may include at least one of phosphorus-doped amorphous silicon, boron-doped amorphous silicon, vanadium oxide, and oxide of manganese, iron, cobalt, nickel or copper.

In a condition that the material of the temperature-sensitive layer 204 includes at least one of phosphorus-doped amorphous silicon, boron-doped amorphous silicon, vanadium oxide, and oxide of manganese, iron, cobalt, nickel or copper, due to high resistivity of such a material, in order to facilitate using of a temperature-sensitive sensor, the resistance adjustment process by laser may be adopted, to cut the temperature-sensitive layer 204, so as to adjust an effective aspect ratio of the temperature-sensitive layer.

In practical applications, in the resistance adjustment process by laser, the temperature-sensitive layer is usually ablated while the resistance value thereof is measured, till a target resistance value is obtained.

In an exemplary embodiment, the ratio of length 1 to width b of the temperature-sensitive layer 204 may be 1:50.

For example, taking the phosphorus-doped amorphous silicon as an example, a block resistance thereof is about 200 MΩ/□, and if a width-to-length ratio is adjusted to 50:1, a resistance value thereof is about 4 MΩ. It may be seen that increasing the width-to-length ratio thereof helps to reduce difficulty of resistance measurement thereof and improve detection accuracy thereof. The block resistance refers to a resistance between edges of a square thin film conductive material (such as a temperature-sensitive layer).

Figure 12:
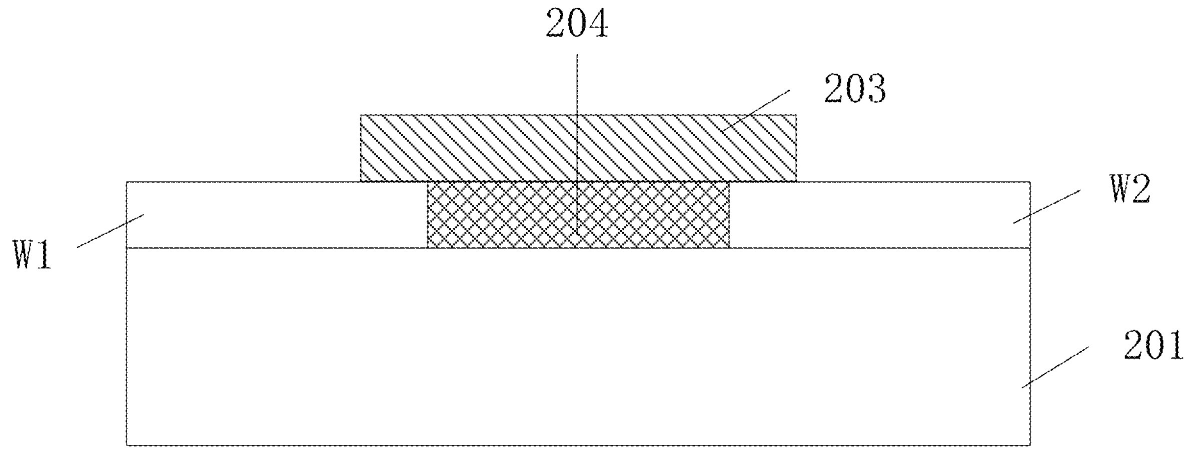

A specific material of the above light-shielding layer 203 is not limited here. For example, the material of the above light-shielding layer 203 may be black insulating resin; alternatively, the material of the above light-shielding layer 203 may be metal. Among them, when the light-shielding layer 203 is the black insulating resin, no insulating layer may be set (as shown in FIG. 12). When the material of the light-shielding layer 203 is the metal, an insulating layer 202 shall be set between the light-shielding layer 203 and the temperature-sensitive layer 204.

For example, the metal may include at least one of molybdenum, chromium, titanium and aluminum.

In the embodiment of the present application, the light-shielding layer 203 is set on the temperature-sensitive layer 204 to avoid generation of photo-carriers in the temperature-sensitive layer 204, so as to avoid an interference of light on electrical characteristics of the temperature-sensitive layer 204, thus improving the detection accuracy of the temperature sensor.

In some embodiments of the present application, referring to that shown in FIG. 11, the temperature-sensitive layer 204, the first lead group (including W1 and W2) and the second lead group (including W3 and W4) are located in the same layer, and the orthographic projection of the temperature-sensitive layer 204 on the substrate 201 and an orthographic projection of the first lead group on the substrate 201 do not overlap to each other, and the orthographic projection of the temperature-sensitive layer 204 on the substrate 201 and an orthographic projection of the second lead group on the substrate 201 do not overlap to each other.

In some embodiments of the present application, referring to that shown in FIG. 10, a part of the temperature-sensitive layer 204 is located in the same layer with the leads in the first lead group (including W1 and W2) and the second lead group (including W3 and W4), and another part of the temperature-sensitive layer 204 extends to a part of surface of at least one lead in the first lead group (including W1 and W2) and the second lead group (including W3 and W4), away from the substrate 201.

In an exemplary embodiment, the orthographic projection of the temperature-sensitive layer 204 on the substrate 201 may overlap an orthographic projection of at least one lead on the substrate 201. In FIG. 10, it is drawn by taken an example that the orthographic projection of the temperature-sensitive layer 204 on the substrate 201 overlaps with an orthographic projection of the first lead W1 on the substrate 201, and the orthographic projection of the temperature-sensitive layer 204 on the substrate 201 overlaps with an orthographic projection of the second lead W2 on the substrate 201.

In some embodiments of the present application, referring to that shown in FIG. 10, FIG. 11 and FIG. 13, the temperature sensor 1 further includes an insulating layer 202, the insulating layer 202 is located between the temperature-sensitive layer 204 and the light-shielding layer 203. An orthographic projection of the insulating layer 202 on the substrate 201 covers the orthographic projection of the temperature-sensitive layer 204 on the substrate 201, and the orthographic projection of the insulating layer 202 on the substrate 201 covers the orthographic projection of the light-shielding layer 203 on the substrate 201.

In the exemplary embodiment, a meaning that the orthographic projection of the insulating layer 202 on the substrate 201 covers the orthographic projection of the temperature-sensitive layer 204 on the substrate 201, and the orthographic projection of the insulating layer 202 on the substrate 201 covers the orthographic projection of the light-shielding layer 203 on the substrate 201 is that, referring to that shown in FIGS. 11-13, the outer contour of the orthographic projection of the temperature-sensitive layer 204 on the substrate 201 is within an outer contour of the orthographic projection of the insulating layer 202 on the substrate 201, and the outer contour of the orthographic projection of the light-shielding layer 203 on the substrate 201 is located within the outer contour of the orthographic projection of the insulating layer 202 on the substrate 201; alternatively, the outer contour of the orthographic projection of the temperature-sensitive layer 204 on the substrate 201 is located within the outer contour of the orthographic projection of the insulating layer 202 on the substrate 201, and the outer contour of the orthographic projection of the light-shielding layer 203 on the substrate 201 overlaps with the outer contour of the orthographic projection of the insulating layer 202 on the substrate 201.

In an exemplary embodiment, a material of the insulating layer 202 may include at least one of nitride, nitrogen oxide or oxide, for example, it is silicon nitride, silicon oxide and silicon oxynitride.

Figure 14:
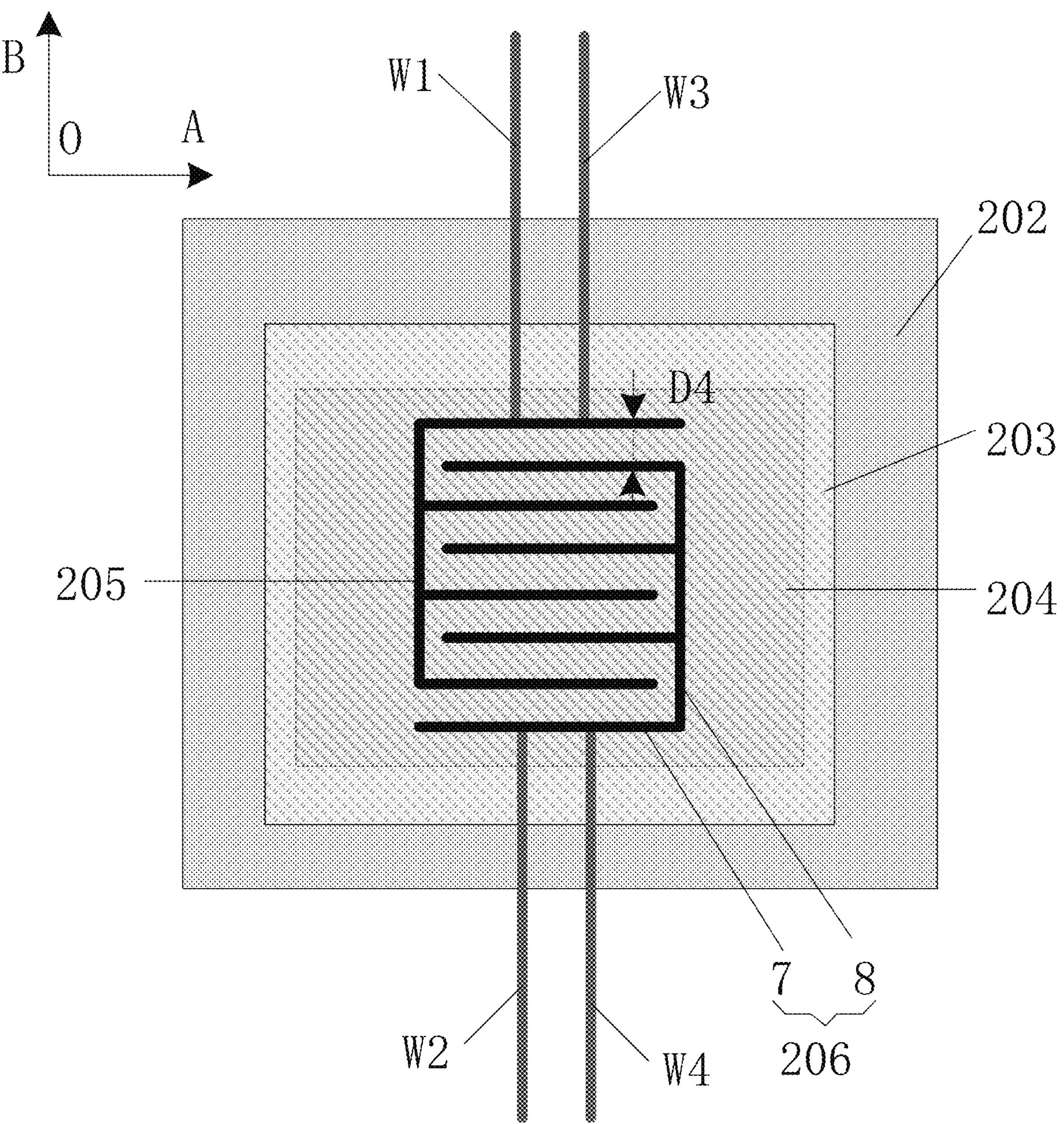

In some embodiments of the present application, referring to that shown in FIG. 14, the temperature sensor 1 further includes a first electrode 205 and a second electrode 206 that are not connected to each other. The first electrode 205, the second electrode 206, the respective leads in the first lead group (W1 and W2) and the respective leads in the second lead group (W3 and W4) are in the same layer.

The first electrode 205 is electrically connected with the first lead W1 and the third lead W3 respectively, and the second electrode 206 is electrically connected with the second lead W2 and the fourth lead W4 respectively. Both an orthographic projection of the first electrode 205 on the substrate 201 and an orthographic projection of the second electrode 206 on the substrate 201 are located within the orthographic projection of the temperature-sensitive layer 204 on the substrate 201, wherein both the first electrode 205 and the second electrode 206 are a gear-shaping electrode.

In some embodiments of the present application, referring to that shown in FIG. 14, the gear-shaping electrode includes at least three tooth electrodes 7 extending in the first direction OA, and a connecting electrode 8 extending in the direction perpendicular to the first direction OA. The connecting electrode 8 electrically connects one ends of the respective tooth electrodes 7. The tooth electrodes 7 of the first electrode 205 and the tooth electrodes 7 of the second electrode 206 are spaced from each other.

In an exemplary embodiment, intervals between respective two adjacent tooth electrodes 7 in the first electrode 205 are the same.

In an exemplary embodiment, intervals between respective two adjacent tooth electrodes 7 in the first electrode 206 are the same.

In an exemplary embodiment, the tooth electrodes 7 of the first electrode 205 and the tooth electrodes 7 of the second electrode 206 are spaced from each other, and an interval D4 from the tooth electrodes 7 of the first electrode 205 to the tooth electrodes 7 of the second electrode 206 in the direction perpendicular to the first direction OA is less than or equal to 50 μm, wherein the first direction OA is the direction in which the liquid droplet flows.

In the embodiment of the present application, in a condition that the material of the temperature-sensitive layer 204 includes at least one of phosphorus-doped amorphous silicon, boron-doped amorphous silicon, vanadium oxide, and oxide of manganese, iron, cobalt, nickel or copper, due to the high resistivity of such a material, in order to facilitate the using of the temperature-sensitive sensor, by setting the gear-shaping electrode, a small resistance may be obtained by a structure of the temperature-sensitive sensor as shown in FIG. 9, so as to match an actual application requirement and facilitate measurement.

It should be noted that, for a gear-shaping type of temperature sensor shown in FIG. 14, a minimum distance from the first electrode 205 to the second electrode 206 along the first direction OA is an effective length 1 of the temperature sensor, and a path length of an area located between the first electrode 205 and the second electrode 206 is an effective width b. According to a definition of resistance, $R=\rho l/S=\rho l/(a*b)$, wherein, ρ is resistivity, a is a thickness of the block temperature-sensitive resistor, l is a length of the block temperature-sensitive resistor, and b is a width of the block temperature-sensitive resistor. After the block temperature-sensitive resistor is manufactured, its thickness a is a determined value. Later, by reducing the effective length 1 and increasing the effective width b, the effective resistance value of the temperature-sensitive resistor may be reduced.

Figure 15:
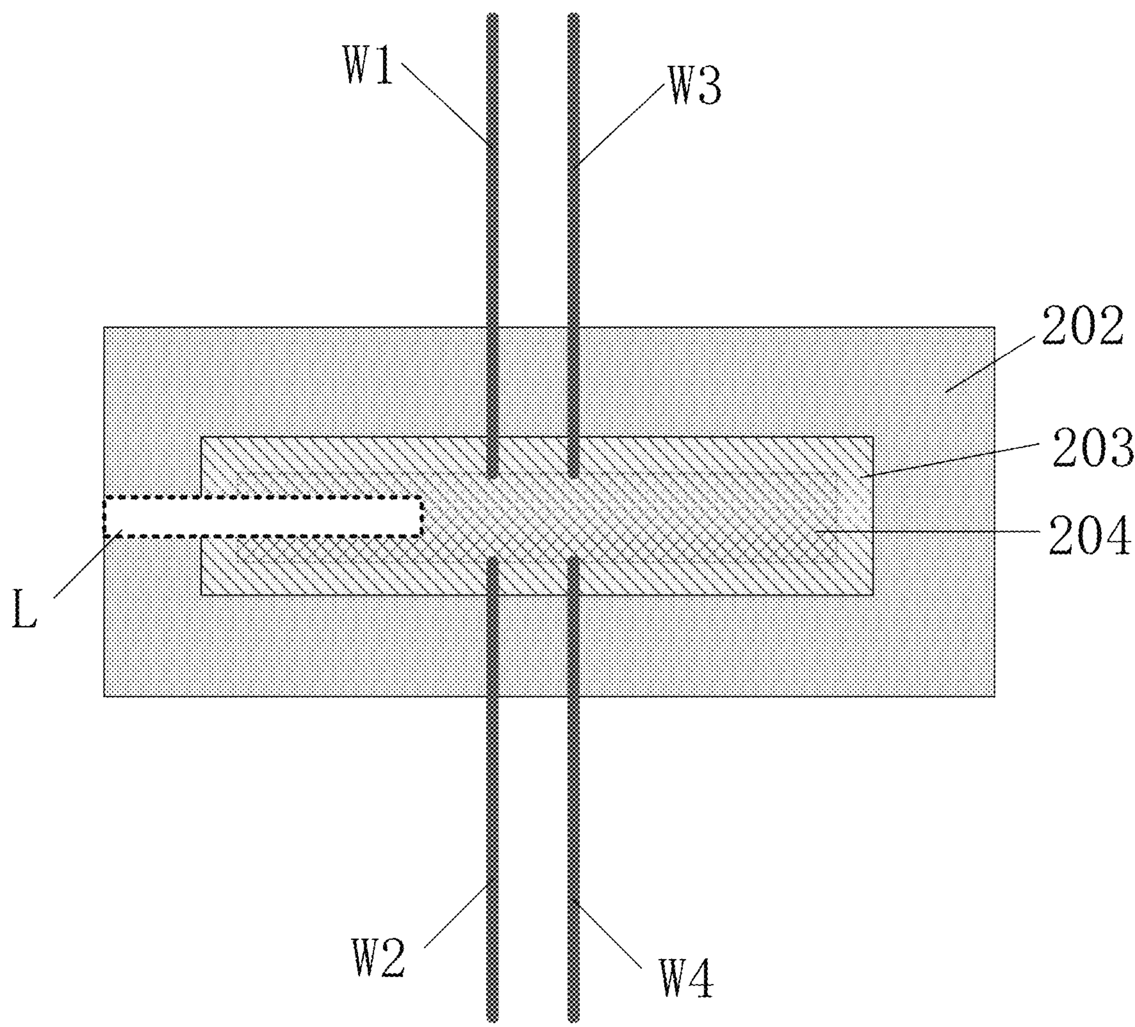

In some embodiments of the present application, referring to that shown in FIG. 15, the temperature-sensitive layer 204 further includes a hollow area L, the hollow area L extends along the first direction OA, a maximum size of the hollow area L along the first direction OA is less than or equal to a half of a maximum size of the temperature-sensitive layer 204 along the first direction OA, and the first direction OA is the direction in which the liquid droplet flows.

For example, in the temperature sensor shown in FIG. 15, the hollow area L may further be extended to the insulating layer, the light-shielding layer and the substrate.

A shape of the orthographic projection of the hollow area L on the substrate shown in FIG. 15 is not limited here. The shape of the orthographic projection of the hollow area L on the substrate may be a rectangle, or an arc, or other polygon, which may be determined according to actual needs.

Figure 16:
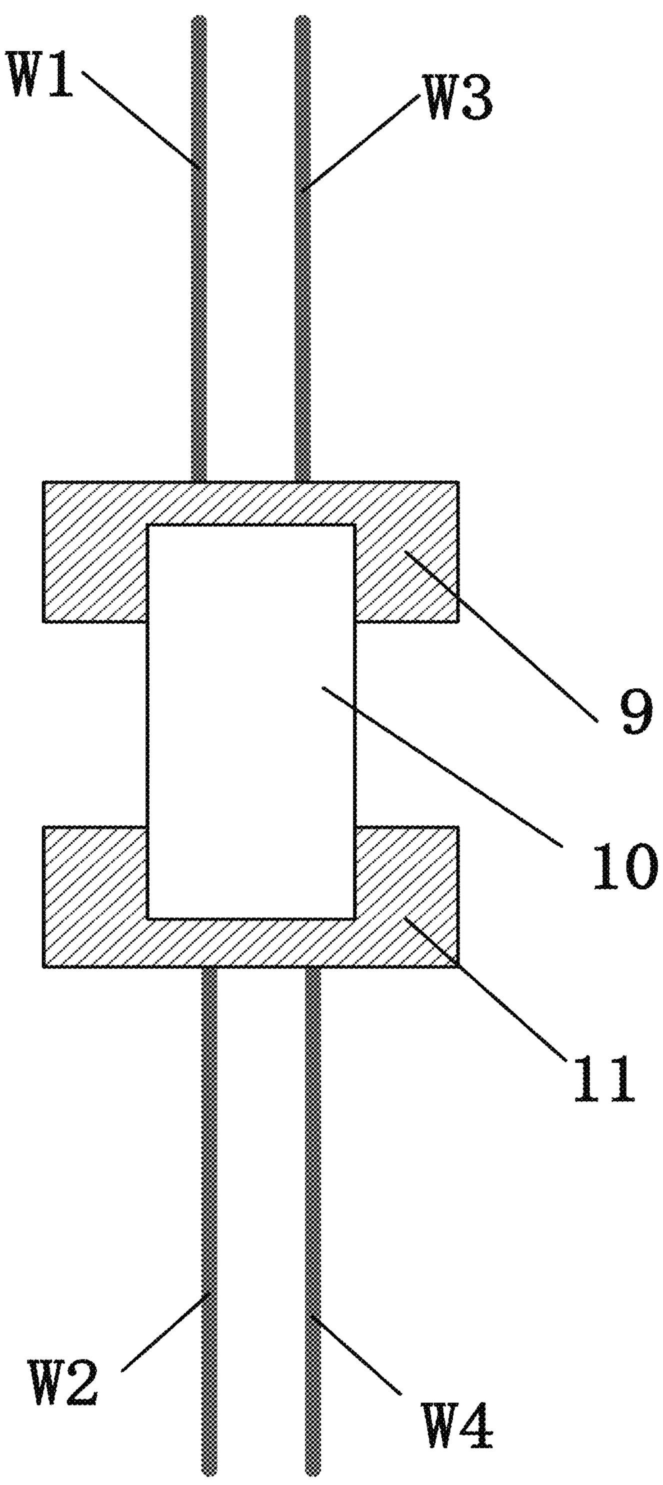

In some embodiments of the present application, referring to that shown in FIG. 16, the temperature sensor includes a thermistor 10, a first conductive layer 9 and a second conductive layer 11. The thermistor 10 is electrically connected with the first lead W1 and the third lead W3 through the first conductive layer 9, and the thermistor 10 is electrically connected with the second lead W2 and the fourth lead W4 through the second conductive layer 11.

Figure 17:
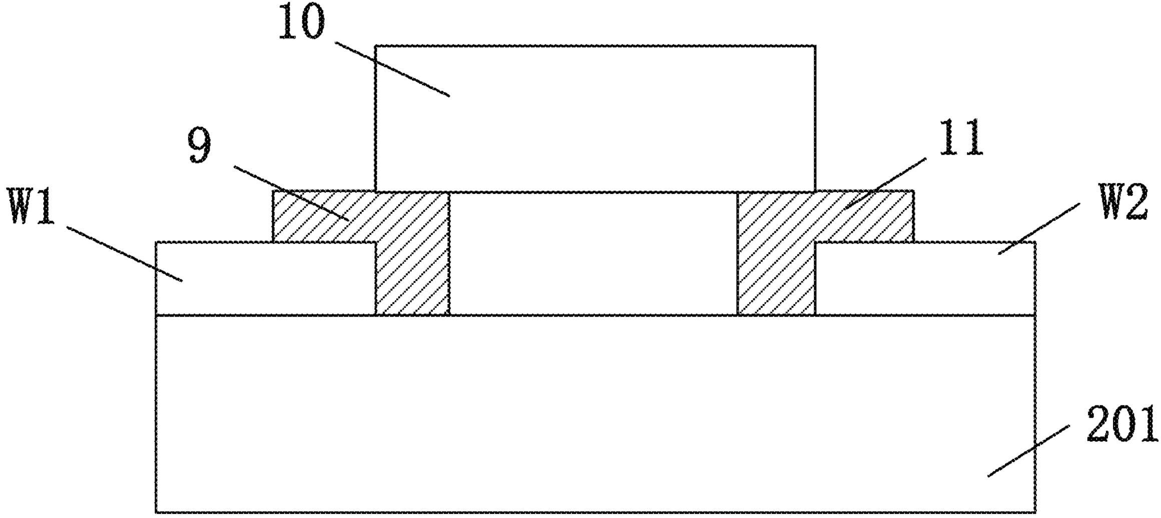
Figure 18:
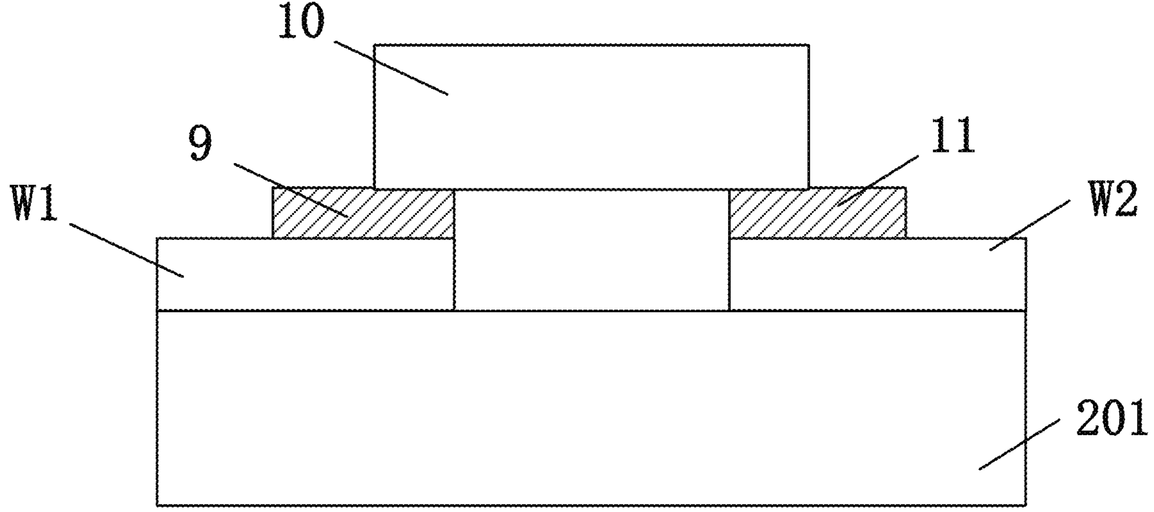
Figure 19:
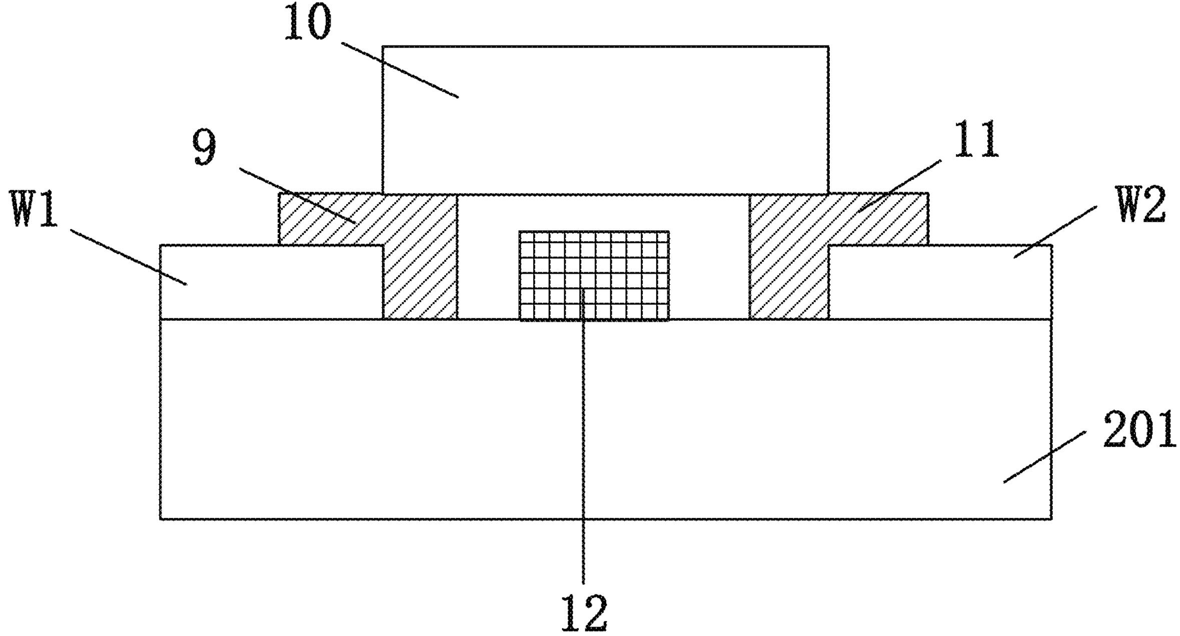

In some embodiments of the present application, referring to that shown in FIGS. 17-19, an orthographic projection of the first conductive layer 9 on the substrate 201 and an orthographic projection of the second conductive layer 11 on the substrate 201 overlap with an orthographic projection of the thermistor 10 on the substrate 201, respectively.

In an exemplary embodiment, a material of the conductive layers (including the first conductive layer 9 and the second conductive layer 11) is a weldable metal, such as copper or tin.

In an exemplary embodiment, referring to that shown in FIG. 18, the conductive layers (including the first conductive layer 9 and the second conductive layer 11) are located on a side of the leads (including the first lead W1, the second lead W2, the third lead W3 and the fourth lead W4) away from the substrate 201, and the conductive layers and the leads are partially overlapped.

In an exemplary embodiment, referring to that shown in FIG. 17, a part of the conductive layers (including the first conductive layer 9 and the second conductive layer 11) are located on a side of the leads (including the first lead W1, the second lead W2, the third lead W3 and the fourth lead W4) away from the substrate 201 and partially overlap with the leads, and the other part of the conductive layers extend to a surface of the substrate 201, cover a part of the substrate 201, and cover a part of side faces of the leads.

In an exemplary embodiment, referring to that shown in FIG. 19, when a part of the conductive layers (including the first conductive layer 9 and the second conductive layer 11) extend to the surface of the substrate 201 and cover a part area of the substrate 201, in order to avoid a short circuit between the first conductive layer 9 and the second conductive layer 11 caused by a unstable preparation process during the preparation process, an insulating wall 12 is set in the temperature sensor, wherein the insulating wall 12 is located between the first conductive layer 9 and the second conductive layer 11, and between the substrate 201 and the thermistor 10. An outer contour of an orthographic projection of the insulating wall 12 on the substrate 201 is located within the outer contour of the orthographic projection of the thermistor 10 on the substrate 201.

Figure 20:
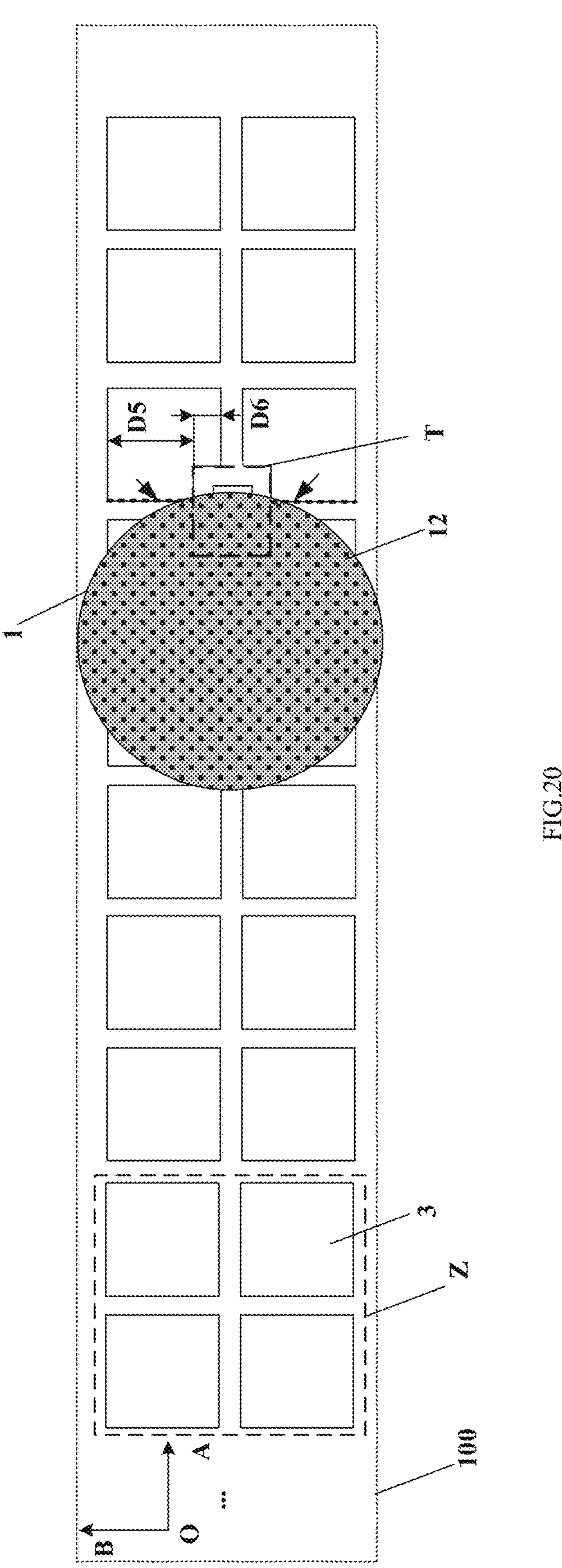
Figure 21:
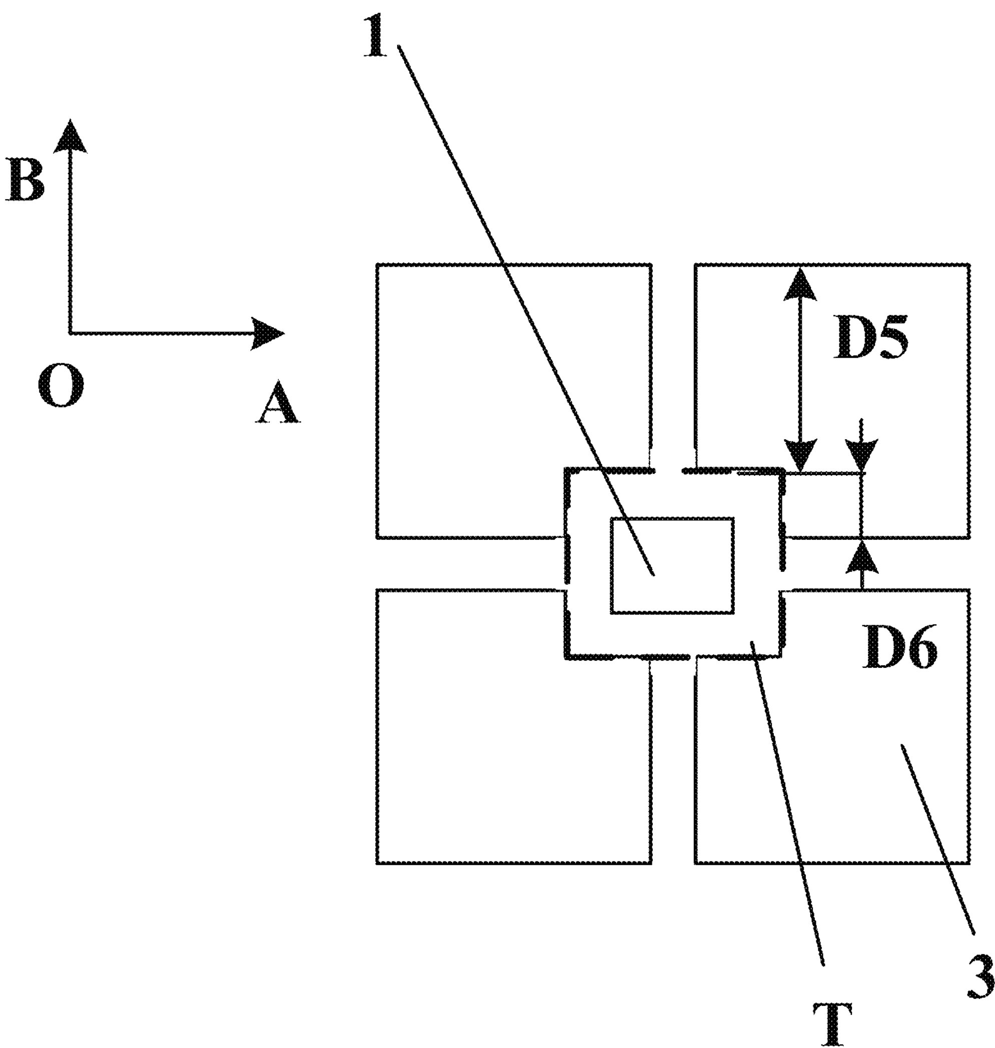

In some embodiments of the present application, referring to that shown in FIG. 20, the droplet control unit includes a plurality of driving electrode groups Z, the respective driving electrode groups Z are arranged along the first direction OA, and the first direction OA is the direction in which the liquid droplet 12 flows. The driving electrode group Z includes a plurality of driving electrodes 3. A temperature measurement area T is arranged among the driving electrodes in at least one of the driving electrode groups Z. In the driving electrode group Z which is provided with the temperature measurement area T, outer contours of orthographic projections of the respective driving electrodes 3 on the substrate 201 and an outer contour of the temperature measurement area T are overlapped;

The temperature sensor 1 is located in the temperature measurement area T, and an outer contour of an orthographic projection of the temperature sensor 1 on the substrate 201 is located within the outer contour of the temperature measurement area T.

In some embodiments of the present application, referring to that shown in FIG. 20, a shape of the orthographic projection the driving electrode 3 on the substrate 201 includes a rectangle and a chamfered rectangle. In the driving electrode group Z provided with the temperature measurement area T, one corners of the respective driving electrodes 3 have a concave part, and the temperature measurement area T includes an area where the respective concave parts are located. A length D6 of the concave part along the second direction BO, is less than or equal to, one third of a length D5 of a side of the driving electrode 3, on which the concave part is set, along the second direction BO. The second direction BO is perpendicular to the first direction OA.

In an exemplary embodiment, in the driving electrode group Z where no temperature measurement area T is set, a shape of the orthographic projections of the respective driving electrodes 3 on the substrate 201 is rectangle. In the driving electrode group Z where the temperature measurement area T is set, a shape of the orthographic projections of the respective driving electrodes 3 on the substrate 201 is a chamfered rectangle.

In the exemplary embodiment, a shape of an outer contour of an orthographic projection of the concave part may include a triangle, a quadrilateral or a sector. For example, in the embodiment in the application, the shape of the outer contour shape of the orthographic projection of the concave part is drawn as a quadrilateral.

In an exemplary embodiment, in the driving electrode group Z where the temperature measurement area T is set, shapes and sizes of the concave parts of the respective driving electrodes 3 are the same.

In the embodiment of the application, referring to that shown in FIG. 20, when the liquid droplet 12 moves along the first direction OA, and when it is about to move into the driving electrode group Z where the temperature measurement area T is set, the liquid droplet first contacts the side of the driving electrode 3 along the second direction BO (the side marked by arrows in FIG. 20), to promote the liquid droplet 12 to continue to move along the first direction OA. When the concave part is set, in order not to affect normal flowing of the liquid droplet, the length D6 of the concave part along the second direction BO, is set to be less than or equal to, one third of the length D5 of the side of the driving electrode 3, on which the concave part is set, along the second direction BO. In this way, the normal flowing of the liquid droplet is ensured, and at the same time, a reasonable distribution of the temperature sensor 1 in the temperature measurement area T is ensured, and a space is saved.

In some embodiments of the present application, the droplet control unit includes an external pump valve, and an orthographic projection of the external pump valve on the substrate 201 is located within an outer contour of the substrate 201.

A specific structure of the above external pump valve is not limited here, but may be determined according to an actual situation.

It should be noted that the microfluidic chip further includes other components and structures, but only the structures related to invention points are described in the specification. Other components and structures included in the microfluidic chip may be referred to the related technology, which will not be repeated here.

An embodiment of the present application further provides an analysis device using the above microfluidic chip, including the above microfluidic chip.

In an analysis device in related technology, in order to test the temperature of the target sample, a temperature sensor is set in a microfluidic chip, and two ends of the temperature sensor 1 are electrically connected with the constant current source through two leads, and the two ends of the temperature sensor 1 are electrically connected with the external voltmeter through the two leads as well. When measuring the voltage of the temperature sensor 1, due to the interference of self-resistances of the leads, the voltage value actually measured by the external voltmeter is the voltage value of the series of the temperature sensor 1 and the two leads, which seriously reduces the accuracy in measuring the voltage across the two ends of the temperature sensor.

In the embodiments of the present application, by setting the first lead group, the external constant current source transmits the constant current to the temperature sensor 1 through the first lead group, so that the two ends of the temperature sensor 1 have the specific voltage difference. By setting the second lead group, the temperature sensor 1 is electrically connected with the external voltmeter through the second lead group. In this way, because the constant current does not flow through the second lead group, the interference of the leads on the voltage measurement of the temperature sensor 1 is avoided, such that the voltage value measured by the external voltmeter is infinitely close to the actual voltage value across the two ends of the temperature sensor 1. Then the resistance value of the temperature sensor 1 is determined according to the voltage value and the current value of the constant current, and the temperature to be measured is determined according to the relationship between the resistance value and the temperature, thus improving detection precision and the detection accuracy of the temperature sensor.

Figure 22:
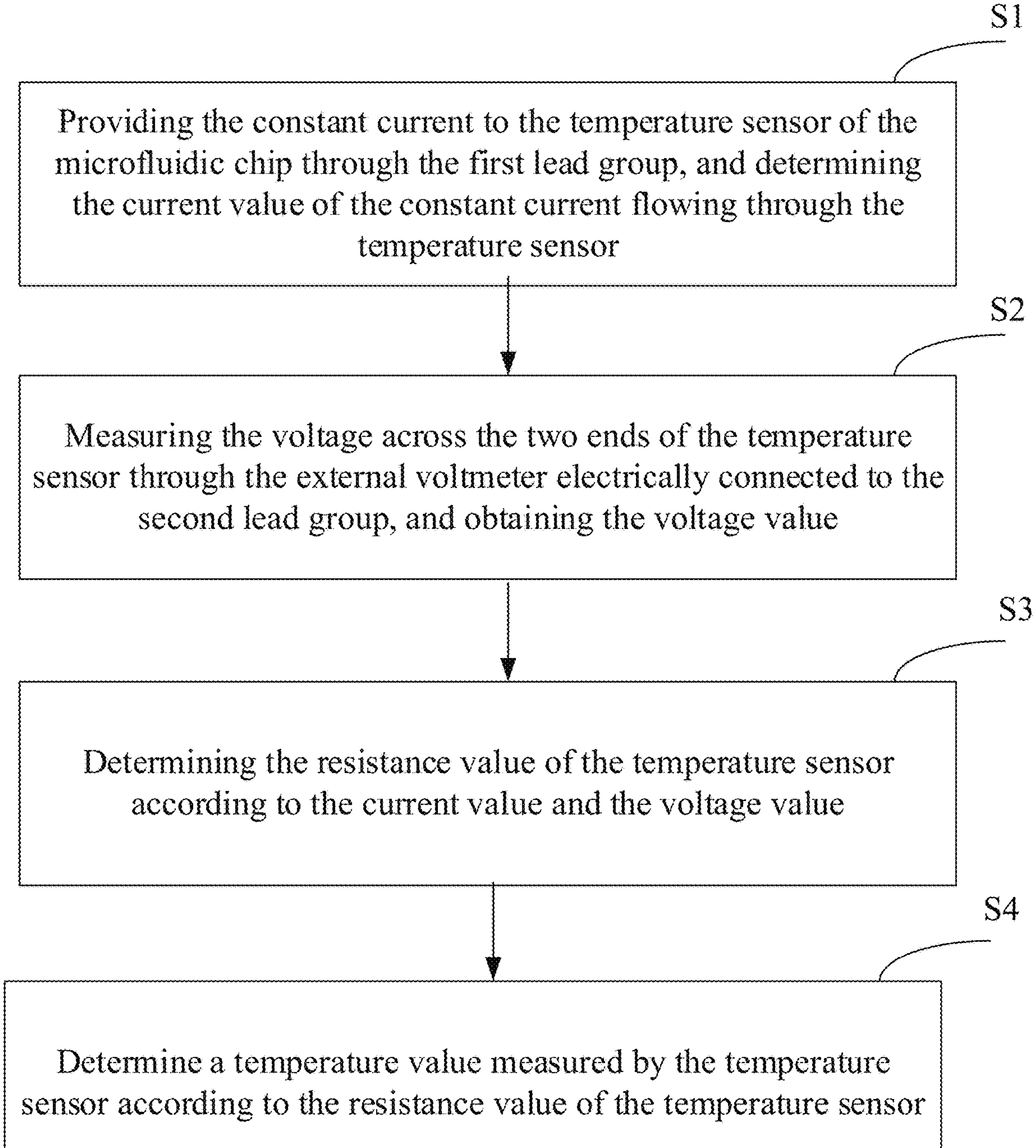
FIG. 22 is a schematic flow chart of a temperature measurement method using the microfluidic chip provided by an embodiment of the application.

An embodiment of the application further provides a temperature measurement method using the above microfluidic chip, and referring to that shown in FIG. 22, the method includes the following steps.

Step S1. Providing the constant current to the temperature sensor of the microfluidic chip through the first lead group, and determining the current value of the constant current flowing through the temperature sensor.

In an exemplary embodiment, the first lead group includes at least two leads, and the number of leads in the first lead group is the even number.

For example, the first lead group may include the first lead W1 and the second lead W2, to electrically connect the two ends of the temperature sensor 1 and the two ends of the constant current source.

Step S2. Measuring the voltage across the two ends of the temperature sensor through the external voltmeter electrically connected to the second lead group, and obtaining the voltage value.

In an exemplary embodiment, the second lead group includes at least two leads, and the number of leads in the second lead group is the even number.

For example, the second lead group may include the third lead W3 and the fourth lead W4, to electrically connect the temperature sensor 1 and the external voltmeter.

Step S3. Determining the resistance value of the temperature sensor according to the current value and the voltage value.

Step S4. Determine a temperature value measured by the temperature sensor according to the resistance value of the temperature sensor.

For example, the above temperature sensor may include the NTC (negative temperature coefficient) type of temperature sensor. Alternatively, the above temperature sensor may include the RTD (resistance temperature detector) type of temperature sensor.

It should be noted that there is a preset relationship between the resistance of the temperature sensor and the temperature value thereof, and the relationship between the resistance of the temperature sensor and the temperature value is determined by the structure and material of the temperature sensor. After the structure and material of the temperature sensor are determined, the relationship between the resistance of the temperature sensor and the temperature value is determined.

In related technology, in order to test the temperature of the liquid droplet on the microfluidic chip, the two ends of the temperature sensor 1 are electrically connected with the constant current source through two leads, and the two ends of the temperature sensor 1 are electrically connected with the external voltmeter through the two leads as well. When measuring the voltage of the temperature sensor 1, due to the interference of self-resistances of the leads, the voltage value actually measured by the external voltmeter is the voltage value of the series of the temperature sensor 1 and the two leads, which seriously reduces the accuracy in measuring the voltage across the two ends of the temperature sensor.

In the embodiments of the present application, by setting the first lead group, the external constant current source transmits the constant current to the temperature sensor 1 through the first lead group, so that the two ends of the temperature sensor 1 have the specific voltage difference. By setting the second lead group, the temperature sensor 1 is electrically connected with the external voltmeter through the second lead group. In this way, because the constant current does not flow through the second lead group, the interference of the leads on the voltage measurement of the temperature sensor 1 is avoided, such that the voltage value measured by the external voltmeter is infinitely close to the actual voltage value across the two ends of the temperature sensor 1. Then the resistance value of the temperature sensor 1 is determined according to the voltage value and the current value of the constant current, and the temperature to be measured is determined according to the relationship between the resistance value and the temperature, thus improving detection precision and the detection accuracy of the temperature sensor.

The above is only the specific implementations of the application, but the scope of protection of the application is not limited thereto. Any technical personnel familiar with the technical field may easily think of changes or replacements within the scope of technology disclosed in the application, which should be covered in the scope of protection of the application. Therefore, the scope of protection of the application shall be subject to the scope of protection of the claim.

The invention claimed is:

1. An analytical device, comprising: an external current source, an external voltmeter and a microfluidic chip, wherein the microfluidic chip comprises: a substrate and at least one microfluidic module located on the substrate, and the microfluidic module comprises a droplet control unit and at least one temperature detection unit, and wherein the at least one temperature detection unit comprises a temperature sensor, a first lead group and a second lead group, the temperature sensor is fixed on the substrate, the first lead group and the second lead group are electrically connected with the temperature sensor respectively, the first lead group is electrically connected to the external current source to transmit a constant current to the temperature sensor, and the second lead group is directly electrically connect the temperature sensor and the external voltmeter such that the constant current does not flow through the second lead group.

2. The analytical device according to claim 1, wherein the first lead group comprises a first lead and a second lead, and the second lead group comprises a third lead and a fourth lead, and the at least one temperature detection unit further comprises two first conductive pads and two second conductive pads, and the first lead group and the temperature sensor are electrically connected with the external current source through the two first conductive pads, and the second lead group and the temperature sensor are electrically connected with the external voltmeter through the two second conductive pads.

3. The analytical device according to claim 1, wherein the temperature sensor comprises a first temperature-sensitive resistor and a second temperature-sensitive resistor electrically connected, and the first temperature-sensitive resistor is a wire temperature-sensitive resistor, and the second temperature-sensitive resistor is a block temperature-sensitive resistor.

4. The analytical device according to claim 3, wherein, in a condition that a temperature is determined, the first temperature-sensitive resistor is a constant resistance and the second temperature-sensitive resistor is an adjustable resistance, and a range of a resistance ratio of the first temperature-sensitive resistor to the second temperature-sensitive resistor, is less than or equal to 20:1.

5. The analytical device according to claim 4, wherein the block temperature-sensitive resistor has at least one hollow area, and a shape of an orthographic projection of the hollow area on the substrate comprises any of an arc, a polygon, or a combination of the arc and the polygon.

6. The analytical device according to claim 5, wherein the block temperature-sensitive resistor has one hollow area, the hollow area comprises a first hollow sub-area set along a first direction and a second hollow sub-area set along a second direction, shapes of orthographic projections of both the first hollow sub-area and the second hollow sub-area on the substrate are rectangle, and the first direction is a direction in which a liquid droplet flows, and the second direction is perpendicular to the first direction, and a ratio of a maximum size of the first hollow sub-area along the first direction to a maximum size of the second hollow sub-area along the second direction ranges from 1:9 to 3:7.

7. The analytical device according to claim 5, wherein the block temperature-sensitive resistor has a plurality of hollow areas set along a first direction, shapes of orthographic projections of the respective hollow areas on the substrate are all rectangles, and the respective hollow areas are not connected to each other, wherein the first direction is a direction in which a liquid droplet flows.

8. The analytical device according to claim 2, wherein the temperature sensor comprises a temperature-sensitive layer and a light-shielding layer located on the substrate, the light-shielding layer is located on a side of the temperature-sensitive layer away from the substrate, and an area of the temperature-sensitive layer is less than an area of the light-shielding layer, such that an orthographic projection of the temperature-sensitive layer on the substrate is located within an orthographic projection of the light-shielding layer on the substrate, and the temperature-sensitive layer is in direct contact with the first lead group and the second lead group respectively.

9. The analytical device according to claim 8, wherein the temperature-sensitive layer, the first lead group and the second lead group are located in a same layer, the temperature-sensitive layer and the first lead group do not overlap to each other, such that the orthographic projection of the temperature-sensitive layer on the substrate and an orthographic projection of the first lead group on the substrate do not overlap to each other, and the temperature-sensitive layer and the second lead group do not overlap to each other, such that the orthographic projection of the temperature-sensitive layer on the substrate and an orthographic projection of the second lead group on the substrate do not overlap to each other.

10. The analytical device according to claim 8, wherein a part of the temperature-sensitive layer is located in a same layer with the first lead and the second lead in the first lead group and the third lead and the fourth lead in the second lead group, and another part of the temperature-sensitive layer extends to a part of surface of at least one of the first lead, the second lead, the third lead and the fourth lead, away from the substrate.

11. The analytical device according to claim 8, wherein the temperature sensor further comprises an insulating layer, the insulating layer is located between the temperature-sensitive layer and the light-shielding layer, an area of the insulating layer is large than the area of the temperature-sensitive layer, such that an orthographic projection of the insulating layer on the substrate covers the orthographic projection of the temperature-sensitive layer on the substrate, and the area of the insulating layer is large than the area of the light-shielding layer, such that the orthographic projection of the insulating layer on the substrate covers the orthographic projection of the light-shielding layer on the substrate.

12. The analytical device according to claim 8, wherein the temperature sensor further comprises a first electrode and a second electrode that are not connected to each other, and the first electrode, the second electrode, respective leads in the first lead group, and respective leads in the second lead group are in a same layer, and the first electrode is electrically connected with the first lead and the third lead respectively, and the second electrode is electrically connected with the second lead and the fourth lead respectively, and both an area of the first electrode and an area of the second electrode are less than the area of the temperature-sensitive layer, such that both an orthographic projection of the first electrode on the substrate and an orthographic projection of the second electrode on the substrate are located within the orthographic projection of the temperature-sensitive layer on the substrate, wherein both the first electrode and the second electrode are a gear-shaping electrode.

13. The analytical device according to claim 12, wherein the gear-shaping electrode comprises at least three tooth electrodes extending in the first direction, and a connecting electrode extending in a direction perpendicular to the first direction, the connecting electrode electrically connects one ends of the respective tooth electrodes, and the at least three tooth electrodes of the first electrode and the at least three tooth electrodes of the second electrode are spaced from each other, and an interval from the tooth electrodes of the first electrode to the tooth electrodes of the second electrode in the direction perpendicular to the first direction is less than or equal to 50 μm, wherein the first direction is a direction in which a liquid droplet flows.

14. The analytical device according to claim 8, wherein the temperature-sensitive layer further comprises a hollow area, the hollow area extends along the first direction, a maximum size of the hollow area along the first direction is less than or equal to a half of a maximum size of the temperature-sensitive layer along the first direction, and the first direction is a direction in which a liquid droplet flows.

15. The analytical device according to claim 2, wherein the temperature sensor comprises a thermistor, a first conductive layer and a second conductive layer, the thermistor is electrically connected with the first lead and the third lead through the first conductive layer, and the thermistor is electrically connected with the second lead and the fourth lead through the second conductive layer.

16. The analytical device according to claim 15, wherein an orthographic projection of the first conductive layer on the substrate and an orthographic projection of the second conductive layer on the substrate overlap with an orthographic projection of the thermistor on the substrate, respectively.

17. The analytical device according to claim 1, wherein the droplet control unit comprises a plurality of driving electrode groups, the respective driving electrode groups are arranged along a first direction, and the first direction is a direction in which a liquid droplet flows, the driving electrode group comprises a plurality of driving electrodes, a temperature measurement area is arranged among the driving electrodes in at least one of the driving electrode groups, and in the driving electrode group which is provided with the temperature measurement area, outer contours of orthographic projections of the respective driving electrodes on the substrate and an outer contour of the temperature measurement area are overlapped, and the temperature sensor is located in the temperature measurement area, and an outer contour of an orthographic projection of the temperature sensor on the substrate is located within the outer contour of the temperature measurement area.

18. The analytical device according to claim 17, wherein a shape of the orthographic projection the driving electrode on the substrate comprises a rectangle and a chamfered rectangle, in the driving electrode group provided with the temperature measurement area, one corners of the respective driving electrodes have a concave part, and the temperature measurement area comprises an area where the respective concave parts are located, and a length of the concave part along a second direction, is less than or equal to, one third of a length of a side of the driving electrode, on which the concave part is set, along the second direction, wherein the second direction is perpendicular to the first direction.

19. A temperature measurement method using the analytical device according to claim 1, wherein the method comprises:

providing the constant current to the temperature sensor of the analytical device through the first lead group, and determining a current value of the constant current flowing through the temperature sensor;

measuring a voltage across two ends of the temperature sensor through the external voltmeter electrically connected to the second lead group, and obtaining a voltage value;

determining a resistance value of the temperature sensor according to the current value and the voltage value; and determine a temperature value measured by the temperature sensor according to the resistance value of the temperature sensor.

* * * * *